United States Patent [19]

Kelling

[11] 3,708,657

[45] Jan. 2, 1973

[54] NUMERICAL CONVERSION APPARATUS FOR INTERFEROMETER POSITION TRANSDUCER

[75] Inventor: Leroy U. C. Kelling, Waynesboro, Va.

[73] Assignee: General Electric Company

[22] Filed: Feb. 29, 1968

[21] Appl. No.: 709,433

[52] U.S. Cl. .........235/156, 235/150.31, 235/92 NT, 235/151.11, 235/154

[51] Int. Cl. ..........................................G06f 7/52

[58] Field of Search...........235/150.3, 92 NT, 92 CC, 235/151.33; 340/347; 328/42, 44

[56] References Cited

UNITED STATES PATENTS

| | | | |
|---|---|---|---|
| 2,913,179 | 11/1959 | Gordon | 235/150.3 |
| 3,408,644 | 10/1968 | Kintner | 340/347 |
| 3,055,585 | 9/1962 | Bell et al. | 235/151.33 X |
| 3,532,865 | 10/1970 | Karp et al. | 235/151.33 X |
| 3,549,870 | 12/1970 | Lay | 235/92 CC |

OTHER PUBLICATIONS

OPTO Mechanism Incorporated Instruction and Maintenance Manual 437L–512 Laser Interferometer, June 1966, page 6.

*Primary Examiner*—Eugene G. Botz
*Attorney*—William S. Wolfe, Frank L. Neuhauser, Joseph B. Forman and Oscar B. Waddell

[57] ABSTRACT

A digitally operable, numerically controlled machine is described which employs an interferometer for position feedback together with a fringe count conversion apparatus capable of operating in a scale of 1, scale of 10, or scale of 100 to accommodate a wide range of machining speeds. The fringe count conversion apparatus converts an input series of electric signal pulses indicative of a quantity being measured (such as distance) into a digital count of standard measurement units. The apparatus is comprised by a digital integrator having an integrand register, a minor sum remainder register and a major sum remainder register with all of the registers being substantially equal in length. A known conversion factor is stored in digital form in the integrand register, and arithmetic processing means are provided for selectively entering values equal to the conversion factor stored in the integrand register into one of the remainder registers in response to the input series of electric signal pulses. The arithmetic processing means also serves to transfer overflow values from the minor sum remainder register into the major sum remainder register whereby the value accumulated in the major and minor sum remainder registers is indicative of the quantity being measured in standard measurement units such as inches or centimeters. The conversion apparatus operates with binary coded decimal digit values and the binary digits of corresponding decimal digit significance are time sequentially grouped in interlaced serially adjoining time relationship whereby processing operations of the arithmetic processing means on binary coded digits of corresponding decimal digit significance is facilitated.

22 Claims, 16 Drawing Figures

INVENTOR.
LEROY U.C. KELLING
BY Michael Masnik
HIS ATTORNEY

INVENTOR.
LEROY U.C. KELLING
BY Michael Masnik
HIS ATTORNEY

PATENTED JAN 2 1973

3,708,657

SHEET 03 OF 12

INVENTOR.
LEROY U.C. KELLING
BY Michael Masnik
HIS ATTORNEY

INVENTOR.
LEROY U.C. KELLING
BY *Michael Masnik*
HIS ATTORNEY

INVENTOR.
LEROY U.C. KELLING
BY Michael Masnik
HIS ATTORNEY

INVENTOR.
LEROY U.C. KELLING

BY *Michael Masnik*

HIS ATTORNEY

INVENTOR.
LEROY U.C. KELLING
BY *Michael Masnik*
HIS ATTORNEY

INVENTOR.
LEROY U.C. KELLING
BY Michael Masnik
HIS ATTORNEY

INVENTOR.
LEROY U.C. KELLING

BY *Michael Masnik*

HIS ATTORNEY

INVENTOR.
LEROY U.C. KELLING
BY Michael Masnik
HIS ATTORNEY

INVENTOR.
LEROY U.C. KELLING
BY Michael Masnik
HIS ATTORNEY

INVENTOR.
LEROY U.C. KELLING
BY Michael Masnik
HIS ATTORNEY

NUMERICAL CONVERSION APPARATUS FOR INTERFEROMETER POSITION TRANSDUCER

BACKGROUND OF THE INVENTION

1. Field of Invention

This invention relates to a new and improved digitally operable, numerical control system for machine tools and the like.

More particularly, the invention relates to digitally operable numerical control equipment and to a novel conversion apparatus for converting input digitized signal pulses into a digital count of standard measurement units, and for achieving the conversion at a one for one rate, or at higher conversion rates by selectively processing groups of input digitized signal pulses simultaneously. This selective conversion at one for one or higher rates is performed with an improved digital integrator having a novel integrand, minor sum and major sum remainder register arrangement employed in conjunction with a serially connected closed loop arithmetic unit and circulating delay line assembly.

2. Description of Prior Art

The ever increasing demand for improved machining accuracy in numerically controlled machine tools has resulted in the development of an interferometer position measuring device for use in conjunction with such machine tools as is described more fully in copending U. S. application Ser. No. 709,387, now U.S. Pat. No. 3,573,805, L. U. C. Kelling, Inventor, filed Feb. 29, 1968 concurrently with this application, and in U. S. application Ser. No. 709,405, C. J. Isak, Inventor, filed Feb. 29, 1968 concurrently with this application, both assigned to the General Electric Company, the assignee of this application. In the numerically controlled machine tool arrangements described in the above-mentioned copending applications, an interferometer is employed as an extremely accurate position feedback device for precisely locating the position of the machining head of the equipment. The machining operation in question may be either contouring along a defined path or positioning to a point in space such as is encountered in drill press operation, etc wherein it is desired to know within microinches (0.000001 inch), or perhaps 10 microinches, the precise location of the working head of the machine tool. The interferometer distance measuring device provides such position locating information within the required accuracy. This is achieved through the use of a coherent light wave interference phenomenon wherein changes in the position of the working head of the machine results in changing the number of interference fringes produced at a detecting location due to out of phase reflected and reference light waves impinging on a detector. As the working head of the machine tool changes location in response to command signals applied to it, the phase of a coherent light wave produced by a laser and reflected from the working head so as to impinge on the detector, changes relative to a reference coherent light wave (produced by the same laser) to thereby produce interference fringe counts which are indicative of changes in position of the machine tool working head. The character of the interference fringe counts is such that movement of the machine tool head in one direction (measured along a defined axis) relative to a reference position produces one characteristic form of phase change interference fringe count pulse that is different from the characteristic form of phase change interference fringe count pulse produced for movement in an opposite direction from the reference position. Hence, the characteristic interference fringe count pulses can be used to indicate up-down or positive and negative movement of the working head relative to the reference position.

The fringe count pulses produced by an interferometer position measuring device are random, i.e., nonsynchronous, in nature and the spacing between fringes (while constant for steady state ambient operating conditions) is in the form of a count number that must be related to standard measurement units. For example, if it is determined that for a given set of ambient operating conditions the spacing between fringes produced by the interferometer is $3.1142697 \times 10^{-6}$ inches then the fringe count produced by the interferometer must be multiplied by this factor (or a similar factor for operation in the metric system) in order to convert the count into meaningful units of distance measurement such as inches or centimeters. To accomplish this conversion the present invention was devised.

Another problem associated with the interferometer position measuring device is brought about by reason of the need for operating a numerical control machine tool utilizing such device over a wide range of machining speeds. The finite processing time required to complete the mathematical processing necessary to accomplish the above-mentioned conversion conceivably could prohibit operation at higher machining speeds. The conversion apparatus comprising the present invention has been designed in such a manner as to overcome this prohibition by special design of the digital integrator employed so as to allow higher processing speeds. This is accomplished by including a feature which allows conversion selectively to take place either in a scale of one operation, or in conversion operations having higher scaling factors such as scale of 10 or scale of 100 wherein a multiple number of counts (10 at a time, 100 at a time) are converted simultaneously. It should also be noted at this point that the conversion apparatus of the present invention is not limited to use for the conversion of fringe count pulses of an interferometer position measuring device, but may be employed in connection with any general conversion problem encountered by numerically controlled equipment where the term "numerically controlled equipment" is intended to include any digitally operable, numerically controlled apparatus such as a general purpose digital computer, machine tool readout for display, sensor or guidance control systems employing digitized signals, machine tool controls, etc.

The output derived from a conversion apparatus constructed according to the invention may be employed as the position feedback signal that is used in the position feedback loop of a numerically controlled machine tool or other similar automatically controlled equipment. The above-mentioned Isak application Ser. No. 709,405 discloses one known numerically controlled machine tool arrangement wherein a digitally operable conversion apparatus is employed in a phase analog position feedback loop of a numerically controlled machine tool.

A problem encountered specifically in the application of the conversion apparatus comprising a part of the present invention for use with an interferometer position measuring arrangement in a numerically controlled, phase analog machine tool control, arises as a result of the inclusion of the conversion apparatus in the closed loop, phase analog feedback control system for automatically and precisely controlling the position of the machine tool head in response to the position feedback signals from the interferometer. In such phase analog type machine tool arrangements there is generally included command data input circuitry (usually in the form of a punched tape reader or other similar device together with its associated command signal generating circuitry) for commanding the machine tool to perform certain machining functions as described more fully in the above referenced Isak application Ser. No. 709,405. This command data input circuitry normally includes a command phase counter for producing a command phase analog signal that is indicative of the position which the machine tool should assume at a given instant. This command phase analog signal is supplied to a wide range discriminator which compares the command phase analog signal to an actual position feedback phase analog signal and produces an output error signal that is used in the further control of the machine tool. The actual position feedback phase analog signal is produced by a feedback variable phase counter that in turn is controlled by the conversion apparatus of the invention. The problem of concern arises in connection with adapting the conversion apparatus of the invention which is capable of selectively operating in a scale of 1, scale of 10 or scale of 100 operating mode to the phase analog position feedback system. The present invention also makes available a feedback timing interval control circuit for adapting the variably scaled output of the multiply scaled conversion unit to a phase analog position feedback system.

It is also desirable that a position readout from the apparatus in true numbers be provided upon demand for use by the operator, etc., in the further control of the machine. Such readout may be in the form of positive and negative numbers indicative of position relative to a reference or base point. The present invention makes available such a readout in standard measurement units upon demand without adversely affecting the further operation of the apparatus.

SUMMARY OF INVENTION

It is therefore a primary object of the invention to provide a new and improved numerical control for a machine tool utilizing an interferometer position measuring device for providing precise digitized feedback signals that are used in the control of the machine tool. The control includes a new and improved numerical conversion apparatus for converting the digitized position feedback signal fringe count supplied by the interferometer into standard units of measurement and employs integrand, minor sum and major sum remainder registers all of the same length. The output from the conversion apparatus is obtained in the major sum remainder register, by means of arithmetic circuit means that employs a closed loop, serially arranged binary coded decimal arithmetic processing unit and circulating delay line of minimum length for achieving higher processing speed with minimum equipment.

Another object of the invention is the provision of a numerical conversion apparatus employing a digital integrator having the above characteristics that operates selectively with conversion constant multiplication factors in a scale of 1, 10 or 100.

Still another object of the invention is the provision of a numerical conversion apparatus wherein the overflows from the minor and major sum remainder registers are supplied through a novel feedback interval timing control circuit to a feedback variable phase counter for conversion to phase analog feedback signals.

Another object of this invention is to provide an improved signal processing arrangement.

A further object of the invention is the provision of a numerical conversion apparatus which includes a readout complementer for complementing negative numbers to negative true numbers, and which provides for circulation of the complemented number through a separate bypass shift register that bypasses the arithmetic unit for reentering into the delay line register the negative number which had been complemented during readout.

A still further object of the invention is the provision of a numerical conversion apparatus having all of the above listed features which is capable of processing three sets of input electric signal pulses, there being one set for each axis of a three orthogonal axes numerically controlled machine, and wherein each set of signal pulses comprises the output signal pulses of an interferometer position measuring device for a respective axis.

Still another object of the invention is the provision of a digitally operable numerical conversion apparatus having the above listed characteristics which further includes means for selectively changing the conversion factor stored in the integrand register for each of the three functions.

In practicing the invention, a digitally operable numerical control for a machine tool or the like is provided which includes a digital integrator having arithmetic processing means for selectively processing one of the variable values supplied to the equipment neither in the scale of one or with some larger scaling factor whereby some known multiple of the actual value is processed in a single operating cycle to provide improved processing speeds. In one embodiment of the invention, the equipment operates with binary coded decimal digits and the known multiple of the actual value being processed by the arithmetic processing means is some known power of 10. Hence the conversion apparatus selectively can be made to operate in a scale of 1, scale of 10, or scale of 100, to convert 1, 10 or 100 counts in a single conversion cycle.

Another feature of the invention is the provision of a new and improved digitally operable conversion apparatus for converting an input series of electric signal pulses indicative of a quantity being measured into a digital count of standard measurement units. The apparatus comprises a digital integrator having an integrand register, a minor sum remainder register and a major sum remainder register all of substantially equal length. A known conversion factor is stored in digital form in the integrand register and the accumulated count in the minor and major sum remainder registers provides the output reading in standard measurement units. The digital integrator includes arithmetic processing means for selectively entering values equal to the conversion factor stored in the integrand register into one of the remainder registers in response to the input series of electric signal pulses and for transferring overflow values from the minor sum remainder register into the major sum remainder registers in a manner such that the value accumulated in the major and minor sum remainder registers is indicative of the quantity being measured in standard measurement units.

Still another feature of the invention is the provision of a digitally operable conversion apparatus having the above characteristics wherein the apparatus is capable of processing three different time sequential functions with each function corresponding to the processing operations performed with relation to one axis of a three orthogonal axis system. Each of the three sets of input electric signal pulses, there being one set for each of the orthogonal axes, comprises the output signal pulses of an interferometer position measuring device for a respective axis.

Still another feature of the invention is the provision of a digitally operable conversion apparatus having the above set forth characteristics wherein means are provided for selectively changing the conversion factor stored in the integrand register for each of the three functions.

A further feature in a preferred form of the invention is the provision of scaling means for selectively entering the conversion factor into the remainder registers either on a one for one basis wherein one conversion factor is entered for each input signal pulse or with larger scaling factors wherein known multiples of the conversion factors are entered in a single cycle of operation of the arithmetic processing means for an equal multiple number of input signal pulses whereby improved processing speeds of the conversion apparatus are obtained.

Another feature of the invention is the provision of a numerically controlled system including a new and improved feedback timing interval control circuit for converting the variably scaled output from the conversion apparatus into feedback interval timing signals suitable for use in a phase analog positioning control.

Still a further feature of the invention is the provision of a readout circuit means for the conversion apparatus for selectively reading out the values stored in the major sum remainder register. This readout circuit means includes complementing circuit means for reading out complemented numbers stored in the major sum remainder register to provide a true negative number at the output of the apparatus together with an indication of sign of the output to indicate that the output number is negative in character. The complementing circuit means further includes bypass shift register means for bypassing the number being complemented around the arithmetic processing unit and back into a delay line recirculation unit during complementing readout operation.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

BRIEF DESCRIPTION OF THE DRAWINGS

FIG. 7 (A) depicts synchronization circuitry for synchronizing entry of new values of the conversion constant

FIG. 9(A) is a timing diagram depicting the time relationship of signals shown in FIG. 9

DETAILED DESCRIPTION OF INVENTION

Overall Control System

Figure 1:
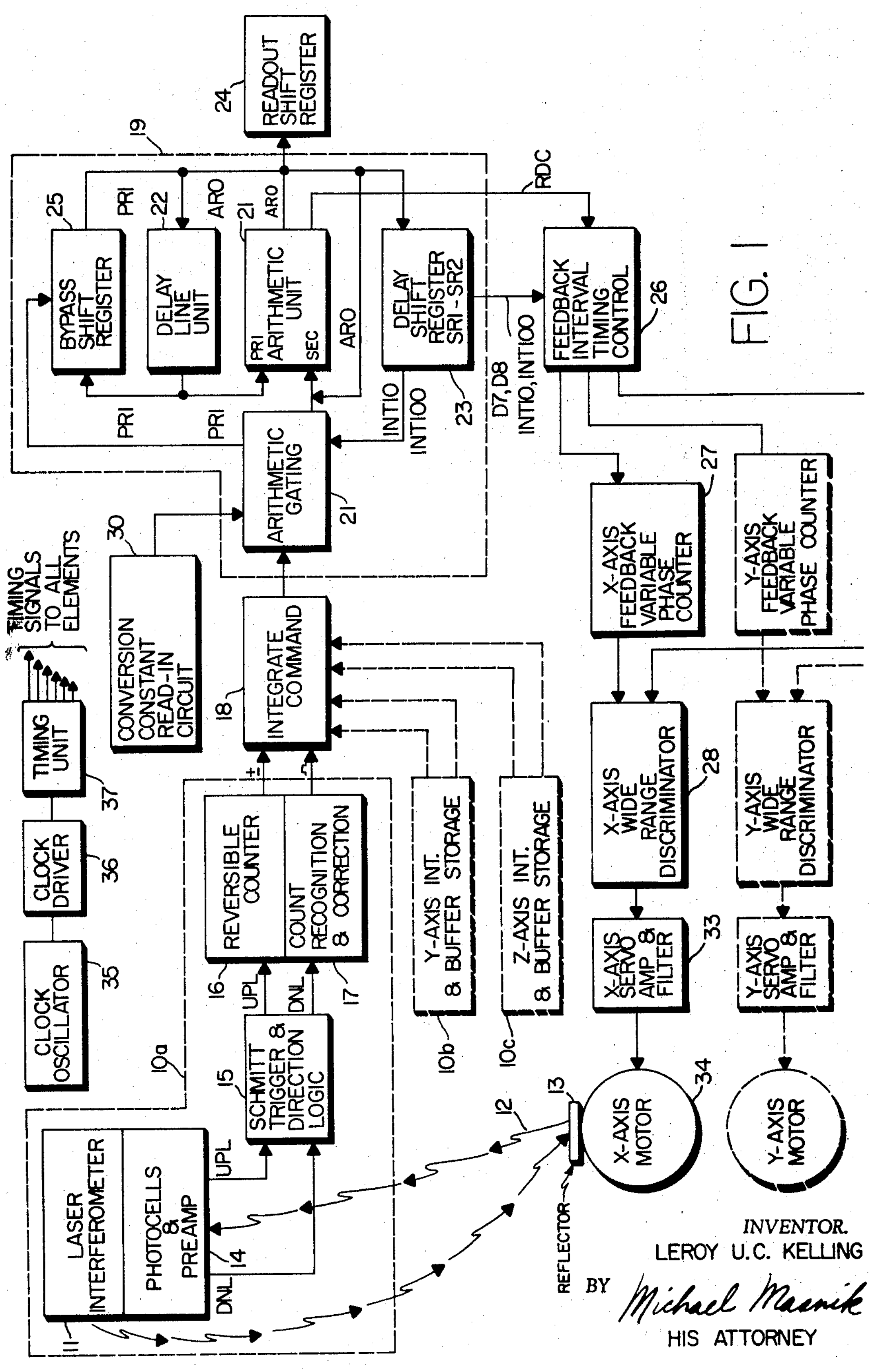
FIG. 1 is a functional block diagram continued in FIG. 1(a) of a digitally operable, numerically controlled machine tool control system employing the novel conversion apparatus and associate circuits of the present invention, and serves to illustrate one known application for the conversion apparatus.
Figure 1:
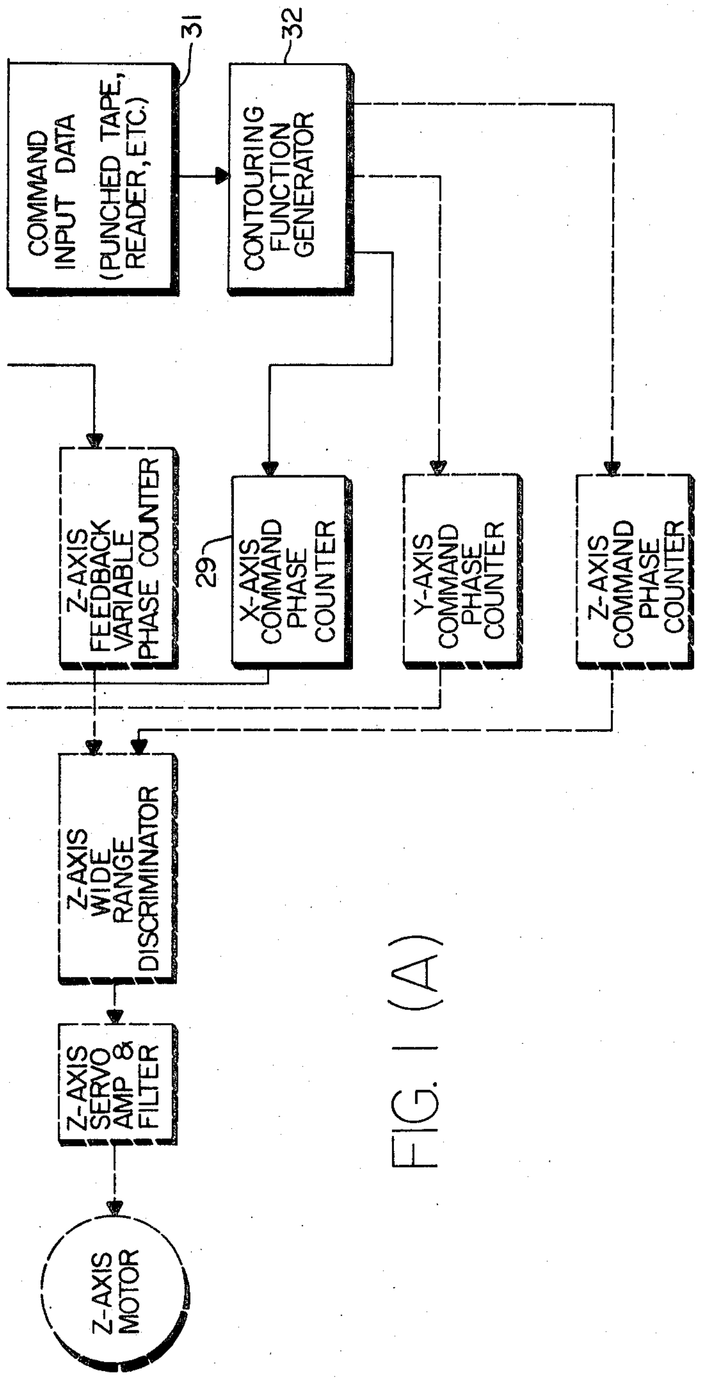

FIG. 1 of the drawings is a functional block diagram of a digitally operable numerical controlled machine tool employing an interferometer distance measuring device and improved numerical conversion apparatus according to the invention. In the equipment shown in block diagram form in FIG. 1, a laser interferometer shown at 11 comprises a part of an X axis position measuring signal input circuitry shown at **10*a*. Similar input circuitry is provided for each of the Y axis and Z axis position input signals. Laser 11 projects a beam of coherent light depicted by the arrows 12 against a reflector 13 which is mounted on, or is an integral part of the working head of the numerical controlled machine tool. The light rays reflected by reflector 13 are returned to the laser interferometer where they impinge upon a photocell detector 14 and produce output fringe count signal pulses which are indicative of changes in the position of the machine tool working head. The laser interferometer distance measuring device is itself not new, and is commercially available, hence, will not be described in detail. The device is capable of producing two output signals indicated as UPL and DNL indicative of the movement of the reflector 13 toward or away from a reference position. These output fringe count signals are in the form of digitized signal pulses which may be supplied directly to Schmitt trigger shaping circuits comprising a part of a Schmitt trigger and direction logic circuit shown at 15. The direction logic circuitry 15 serves to convert the incoming up and down pulses UPL and DNL to two series of pulses having the same polarity, and also marked UPL and DNL. Along with this conversion, a sign signal generator is set to indicate to the buffer storage circuitry comprised by a reversible counter 16 whether or not an incoming series of signal pulses are positive or negative in character. The reversible counter 17 temporarily stores the incoming fringe count pulses UPL and DNL until they can be supplied at an appropriate time, through count recognition and correction circuits 17, and integrate command circuits 18 to 19. The 19 is comprised by an arithmetic unit 20, arithmetic gating circuits 21 and a delay line 22 together with a bypass shift register 25 and delay shift registers 23. The conversion constant used in the conversion operation is supplied from a conversion constant readin circuit 30 through gating circuit 21 to the arithmetic processing circuit means 19. The arithmetic unit 20 is described more fully in a copending U. S. Pat. application Ser. No. 709,404 and filed Feb. 29, 1968 L. U. C. Kelling, inventor, now U.S. Pat. No. 3,571,582, and in U. S. Pat. application Ser. No. 709,386 filed Feb. 29, 1968 J. T. Evans, inventor, now U.S. Pat. No. 3,584,206, both assigned to the General Electric Company. Briefly, however, it can be stated that the arithmetic unit 20 comprises logic circuits that are interconnected together and in a closed serial loop with a circulating delay line unit shown at 22** as will be described more fully hereinafter. The arithmetic processing circuitry thus comprised simultaneously receives two serial input signals identified as PRI and SEC (in groups of four bits representing decimal digits in BCD code) and forms a sum or difference output identified as ARO in accordance with the state of the subtraction command signals supplied thereto and identified hereinafter as $N_1$ and $N_2$. The resultant ARO output lags the input by four bit times so as to facilitate operations of the arithmetic processing circuitry by allowing the output to be readily fed back to the input for addition to the next four bit BCD decimal digit. The arrangement of the BCD data is such that the least significant bits and digits always precede the more significant bits, and digit and word interlace of the data permits three words to be alternately processed at each decimal digit level so that the words of corresponding decimal digit values can be readily processed in a single operating cycle of the arithmetic unit.

In order not to unduly limit the speed of machining operations with which the equipment is used, scaling means are provided for operating the arithmetic unit 20 selectively either in a scale of 1 conversion mode or scale of 10 and scale of 100 conversion modes. This means comprises the delay shift registers SR1 and SR2 shown at 23 that are made operable through arithmetic gating circuit 21. The construction and operation of the delay shift registers SR1 and SR2 will be described more fully hereinafter along with arithmetic gating circuits 21.

The output signals from the arithmetic unit 20 marked ARO may be read out into a readout shift register shown at 24 upon demand. The reading out of the values used in the arithmetic unit 20 into the readout shift register 24 requires complementing of negative numbers to negative true numbers in the readout operation. Because of this fact, bypass shift register circuitry shown at 25 is provided for circulation of the complemented number around the arithmetic unit 20 for reentry into the delay line register 22 under the control of arithmetic gating circuit 21 as will be described more fully hereinafter. By this arrangement, readout of the values in the arithmetic unit 20 does not adversely affect operation of the conversion apparatus.

In addition to being supplied to the readout shift register 24, the output signal RDC from the arithmetic unit 20 is also supplied to a feedback interval timing control circuit 26 which comprises a part of a closed loop, phase analog feedback system employed in precisely driving the servomotor used to position the working head of the numerically controlled machine. FIG. 1 of the drawings illustrates in block diagram form the nature of a three axis numerically controlled machine which is designed to employ the conversion apparatus comprising the present invention. Because each axis is essentially similar, and time shares the conversion apparatus in accordance with well known time sharing principles, only a single axis (the X-axis) system components will be described. The additional Y and Z axis systems tare constructed and operate in essentially the same manner, so they will not be described in detail.

The feedback interval timing circuit 26 supplies its output to an X axis feedback variable phase counter 27 of conventional construction whose output in turn is supplied to one of the input terminals of an X axis wide range discriminator 28. The wide range discriminator 28 has a second input terminal which is connected to the output of an X axis command phase counter 29.

The X axis command phase counter is in turn controlled by the output from command input data circuitry shown at 31 and which may comprise a punch tape reader or the like for supplying command instructions to a contouring function generator 32 that in turn controls the X axis command phase counter 29. All of the elements 27 through 32 are of known construction and are standard parts of any numerically controlled phase analog positioning system. For a more detailed description of a suitable construction for each of these elements, reference is made to U. S. Pat. No. 3,226,649 issued Dec. 28, 1965 to L. U. C. Kelling for a "Pulse Train Phase Modulator For Control System" and assigned to the General Electric Company.

In operation, the feedback interval generator 26 serves to convert the incoming digitized RDC signal from the arithmetic unit into an essentially symmetrical square wave feedback interval timing signal for supply to the X axis feedback variable phase counter 27 to generate at its output an essentially square wave, phase shifted analog signal whose phase shift is representative of the actual position of the machine tool head as measured by the interferometer. The command input data circuitry 31 (punch tape reader, etc.) develops at its output a digitized command signal that operates through the contouring function generator 32 to develop velocity (rate) signal that is converted by the X axis command phase counter 29 into a phase shifted (with respect to a reference clock square wave signal) command signal indicative of the desired rate of movement for the machine tool working head. This phase analog command signal is compared to the actual position phase analog signal in the wide range discriminator and an essentially linear error signal is derived from its output and applied through an X axis servo amplifier 33 of conventional construction to the X axis servomotor 34 to cause the same to move the machine tool working head in a direction to reduce the error towards zero in a conventional manner. It will be appreciated from the foregoing description, therefore, that the laser interferometer distance measuring device and its associated conversion apparatus in fact serve in place of the usual position resolver normally located on the machine tool working head as a position signal generator. As was described more fully in the above referenced L. U. C. Kelling application Ser. No. 709,387, the use of the digitized interferometer feedback signal allows for much more precise positioning of the machine tool working head than is otherwise achievable with the conventional position resolver signal generators. The Y axis and the Z axis positioning systems function in an entirely similar manner, and their position feedback signals are derived from similar laser interferometer positioning measuring device and input circuitry as shown at 10b and 10c on a time sharing basis with the X axis position feedback signal.

In order to operate in the above described fashion, all of the elements of the numerically controlled equipment are driven from a common clock signal source comprised by a conventional clock oscillator 35 whose output is supplied through a clock driver 36 to a timing unit 37 that serves to develop the several timing signals required din the operation of the equipment as will be described more fully hereinafter.

The overall digitally operable numerically controlled machine tool arrangement shown in FIG. 1 of the drawings operates in the manner set forth in the following brief description. A more detailed description of the construction and operation of the new and improved conversion apparatus and other important parts of the system shown in FIG. 1, will be set forth in greater detail in conjunction with the remaining drawings of the application.

In placing the equipment shown in FIG. 1 in operation, command input data is supplied through the punched tape reader, etc. 31 to the contouring function generator 32 that supplies the necessary velocity command signal inputs to the X axis command phase counter 29. As is set forth in greater detail in the above referenced Kelling U. S. Pat. No. 3,226,649 the contouring function generator 32 develops a velocity command signal together with a distance setting adjustment which will determine the ultimate position to which the X axis motor will be driven, and supplies the velocity (rate) signal to the X axis command phase counter 29. Command phase counter 29 in turn develops a square wave shaped, continuously phase shifted command signal representative of the desired rate of movement of the X axis motor. This square wave, phase shifted command signal is then supplied to the X axis wide range discriminator 28 to develop an error signal that is further amplified and shaped in the servo amplifier 33 and applied to the X axis motor 34 to start driving the motor 34 in the desired direction at the desired rate. As the X axis motor 34 is driven in response to the command input data, the laser interferometer position measuring device 11, 14 will be developing fringe count output pulses which will be either positive or negative in character indicating positive and negative movement of the X axis motor relative to a reference position.

The positive and negative fringe count pulses are supplied through the Schmitt trigger and direction logic circuitry 15 to the buffer storage comprised by reversible counter 16. The buffer storage comprised by reversible counter 16 and its associated count recognition and correction circuitry is described more fully in copending U. S. Pat. application Ser. No. 709,368, H. E. Vigour, inventor, now U.S. Pat. No. 3,627,996, entitled "Buffer Memory for Digital Equipment Having Variable Rate Input" filed Feb. 28, 1968 concurrently with this application, and assigned to the General Electric Company. Briefly stated, the buffer storage circuitry serves to accumulate the input positive and negative interferometer fringe count pulses in the reversible counter 17. To simplify the description, only the add pulses will be considered, however, the same remarks apply with respect to the subtract pulses. The incoming add pulses occur at a random time having no synchronous relationship to the clock signals produced by the clock timing unit 37 which supply the required timing signals to the arithmetic processing circuit means 19. The timing of the input fringe count pulses is random because the signal is initiated by the motion of the X axis servomotor 34 and hence is unrelated to the timing signals produced by the timing unit 37. Due to the fact that a serial type of adder-subtracter is employed in the arithmetic unit 20, the conversion processing generally requires a finite number of clock periods for a complete arithmetic processing cycle of operations. Hence, some form of buffer storage is required to accumulate and temporarily store the incoming fringe count signal pulses until they can be utilized by the arithmetic processing circuit means 19. Simple flip-flop memory units or a straightforward shift register could be used to provide short time period storage of the incoming fringe count pulses except for a second problem related to the speed of computation of the arithmetic processing means 19. Since some finite time is required for each addition or subtraction operation, if each incoming pulse produces a corresponding addition or subtraction operation, a calculable upper limit would be set for the machine tool speed. For example, if the add time is 20 microseconds and the optical constant or increment size of the fringe count pulses is $3.12 \times 10^{-6}$ inches, maximum machine speed would be $3.12 \times 10^{-6}$ inches every 20 microseconds or 9.33 inches per minute.

In order to increase machine speed, the constant may be multiplied by 10 through the process of shifting it one place in the decimal storage register before adding it into the position register for processing by the arithmetic processing circuit means 19. By adding it in at ten times its normal value, the machine speed limitation set by the required finite addition time may be increased by a factor of 10. The same principle may be extended to increase the speed limitation by a factor of 100. For proper control of the multiplication by 10 or multiplication by 100 addition, the initial accumulation in the buffer storage of one hundred or more add pulses is needed in order that the faster arriving pulses may be properly assimilated while the adder-subtracter circuitry is still occupied with processing a previous batch of pulses. It will be appreciated, therefore, that the primary purpose of the buffer storage means 16 is to add or subtract incoming fringe count pulses occurring at times when they cannot be immediately processed, to combine the mixed sequence of add and subtract pulses into a single net sum of pulses in the reversible counter 17, and to produce, store and deliver commands to the adder-subtracter in the arithmetic processing circuit means 19, including signals to shift the constant one or two places when appropriate on the basis of the contents of the reversible counter 17, so as to process 10 or 100 pulses at a time.

The heart of the arithmetic processing circuitry means 19 is the arithmetic unit 20. For a detailed description of the construction and operation of the arithmetic unit 20, reference is made to copending U. S. Pat. application Ser. No. 709,386 J. T. Evans, inventor, filed Feb. 29, 1968 and assigned to the General Electric Company. Briefly, however, the arithmetic unit 20 operates by simultaneously receiving two serial input signals at its input terminals marked PRI and SEC. These input signals are in the form of groups of four bits representing decimal digits in binary coded decimal form. The arithmetic unit 20 either adds or subtracts the input signals to form a sum or difference output signal ARO in accordance with the state of the subtraction command signals supplied thereto. The resultant ARO output signal lags the input signals by four bit times so as to facilitate direct feedback of the output signal ARO to the SEC input terminal to facilitate addition or subtraction of one BCD-decimal digit to the next succeeding BCD decimal digit in a manner which will be described more fully hereinafter in connection with the detailed discussion of the arithmetic processing circuit means 19.

The addition or subtraction operation within the arithmetic unit 20 is performed in two steps. First, in the input section to the arithmetic unit, the addition or subtraction is performed as a pure binary operation with the results shifted serially into a binary sum shift register. At the time of the last of each group of four bits in the BCD digits being processed, the binary sum is examined for the need to correct it in order to form a true BCD coded decimal digit and to generate a decimal carry or borrow signal for the next more significant decimal digit. Secondly, as the binary sum is shifted out of the binary sum shift register, it is corrected by either the addition or subtraction of six. The least significant bits and digits always precede the more significant bits and digits and word interlace employed in the format of the BCD digit as used in the overall equipment permits three words to be alternately processed at each decimal digit level prior to proceeding to the next higher decimal digit value.

The arithmetic unit output signals ARO may be read out upon demand by a readout shift register 24 for use by an operator, etc. in the further control of the equipment. During readout, negative signals resulting from the arithmetic processing operation are complemented by subtracting negative numbers in their complemented form from zero. The need for the complementing operation is dictated by the fact that on a machine tool it is generally necessary for the machine to be able to position to the positive and negative side of a zero reference point thereby creating a condition in which the number is in its true dimensional value with respect to the reference point for up scale positions, and in which the number is in a complemented form for positions down scale of the reference point. For example, a complemented number would be one such as 997.23514 inches where the true negative distance would be obtained by subtracting this number from 1,000. Consequently, in order to obtain a reading of the true negative numbers, it is necessary to circulate such data through the arithmetic unit 20 for one cycle to effect a complementing conversion by subtracting the negative number in its complemented form from zero. The resulting difference is then fed out to the readout shift register 24 along with a negative sign to indicate that the number is a negative number, and this provides the true negative reading. During this complementing operation, borrows from the most significant digit are disregarded.

It should be noted at this point that the arithmetic unit 20 is used in conjunction with a circulating delay line 22 which serves to store the data in the various registers of the digital integrator comprised by the closed loop, serially connected arithmetic unit 20 and the delay line unit 22. In order to preserve negative numbers in their complemented form during a readout operation in which complementing is being performed, the complemented number stored in the register is circulated through a separate, bypass four-bit shift register 25 for bypassing the arithmetic unit 20 during a complementing operation, and reentering the complemented number back into the delay line storage register at its proper point synchronously with the complementing readout operation. This bypass of the complemented number around the arithmetic unit is necessary due to the fact that the information coming out of the arithmetic unit during a complementing readout operation is not suitable in form for reentry into the delay line register. Also, it should be noted that in order to effect a complementing readout operation, it is necessary to interrupt the normal conversion processing operations of the arithmetic unit for one circulation of the conversion process. This interruption generally does not cause any significant change in operation of the system.

As will be described more fully hereinafter, the closed loop, serially connected arithmetic unit 20 and the delay line unit 22 comprise a digital integrator wherein the integrand and remainder registers are comprised by the circulating data stored in the circulating delay line unit 22. This data is serially circulated through the arithmetic unit 20 by appropriately timed clock and timing signals derived from the timing unit 37 for serial processing in the above-described fashion by the arithmetic unit 20. As will be described more fully hereinafter, the words comprising the integrand and remainder registers are time sequentially grouped in interlaced serially adjoining time relationship to form an integrand register (which stores the conversion constant supplied by conversion constant readin circuit 30) a minor sum remainder register and a major sum remainder register with all of the registers being substantially equal in length.

In operation, the arithmetic unit 20 serially enters values equal to the conversion factor stored in the integrand register into one of the remainder registers in response to the input series fringe count signal pulses being supplied from the buffer storage circuit 316. For a scale of one operation, the incoming fringe count pulse causes the conversion constant stored in the integrand register to be added into the minor sum remainder register at all digit levels and overflow carry or borrow values are transferred into the next most significant decimal digit and overflow carry and borrow values are transferred from the minor sum remainder register into the major sum remainder register. The value accumulated in the major and minor sum remainder registers at any given instant therefore will be indicative of the total distance that the X axis motor has moved the machine tool head relative to an initial zero reference position in response to the command input signals.

In addition to the scale of one operation described above, the arithmetic unit 20 selectively can be made to operate in a scale of ten and scale of one hundred mode by scaling means that employ the delay shift register 23 for selectively entering known multiples of the conversion factor into the remainder registers for an equal multiple number of input fringe count pulses in a single cycle of operation of the arithmetic unit thereby processing a multiple number of input fringe count signal pulses to achieve improved processing speeds of conversion. Since the conversion apparatus operates with binary coded decimal digits, and the binary digits of corresponding decimal digit significance are time sequentially grouped in interlaced serially adjoining time relationship, the scaling circuitry operates in known powers of 10 selectively to enter the conversion factor into the remainder registers either by a scale of 1, a scale of 10 or a scale of 100 operation whereby during the scale of 10 and scale of 100 operating modes either 10 input fringe count pulses or 100 input fringe count pulses are processed simultaneously in a single operating cycle of the arithmetic unit to thereby achieve greatly improved processing speeds.

In the scale of 1 operating mode, the simple overflow from the minor sum register to the major sum register occurs in the conversion of one or more units of fringe count for one conversion cycle (i.e., one operating cycle of the arithmetic unit 20). In the conversion of 10 or 100 units of fringe count in one conversion cycle, the number in the conversion constant register is increased in magnitude by 10 or 100 times for entry into the arithmetic unit. This is achieved by the method of moving each digit of this constant to a time of greater significance in the serial computation. Thus, in the 10 and 100 unit conversion process, the one and two most significant digits of the conversion factor are added respectively to the first one and first two of the least significant digits of the major sum register. This shifting and selection will be described in greater detail in the following description.

For the scale of 10 and the scale of 100 operating mode, the ARO output signal from the arithmetic unit 20 also is supplied to the feedback interval generator 26. The feedback interval timing control circuit 26 is shown in greater detail in FIG. 9 of the drawings and will be described more fully hereinafter. For present purposes, however, it can be briefly stated that the feedback interval timing control serves to develop feedback timing control signals proportional to the count being supplied thereto over the ARO output lead from the arithmetic unit 20 during the scale of 10 and the scale of 100 operating mode, and to develop feedback timing control signals proportional to the units count supplied thereto over a lead labeled RDC (minor sum carry into major sum) during the scale of one operating mode. The feedback interval timing control signals developed by the feedback interval timing control 26 are then supplied to the X axis, Y axis and Z axis feedback variable phase counters which operate in a well known manner to develop phase shifted, square wave analog feedback signals that are applied to the wide range discriminator 28 for use in developing feedback error signals that are applied through the servo amplifiers 33 to the respective servomotors 34 for each axis. As stated previously, the X, Y and Z axis input circuits are time shared in the processing operations of the arithmetic processing circuit means 19 in a manner which will be described more fully hereinafter in conjunction with FIGS. 2 through 8 of the drawings.

Arithmetic Processing Circuit

Figure 2:
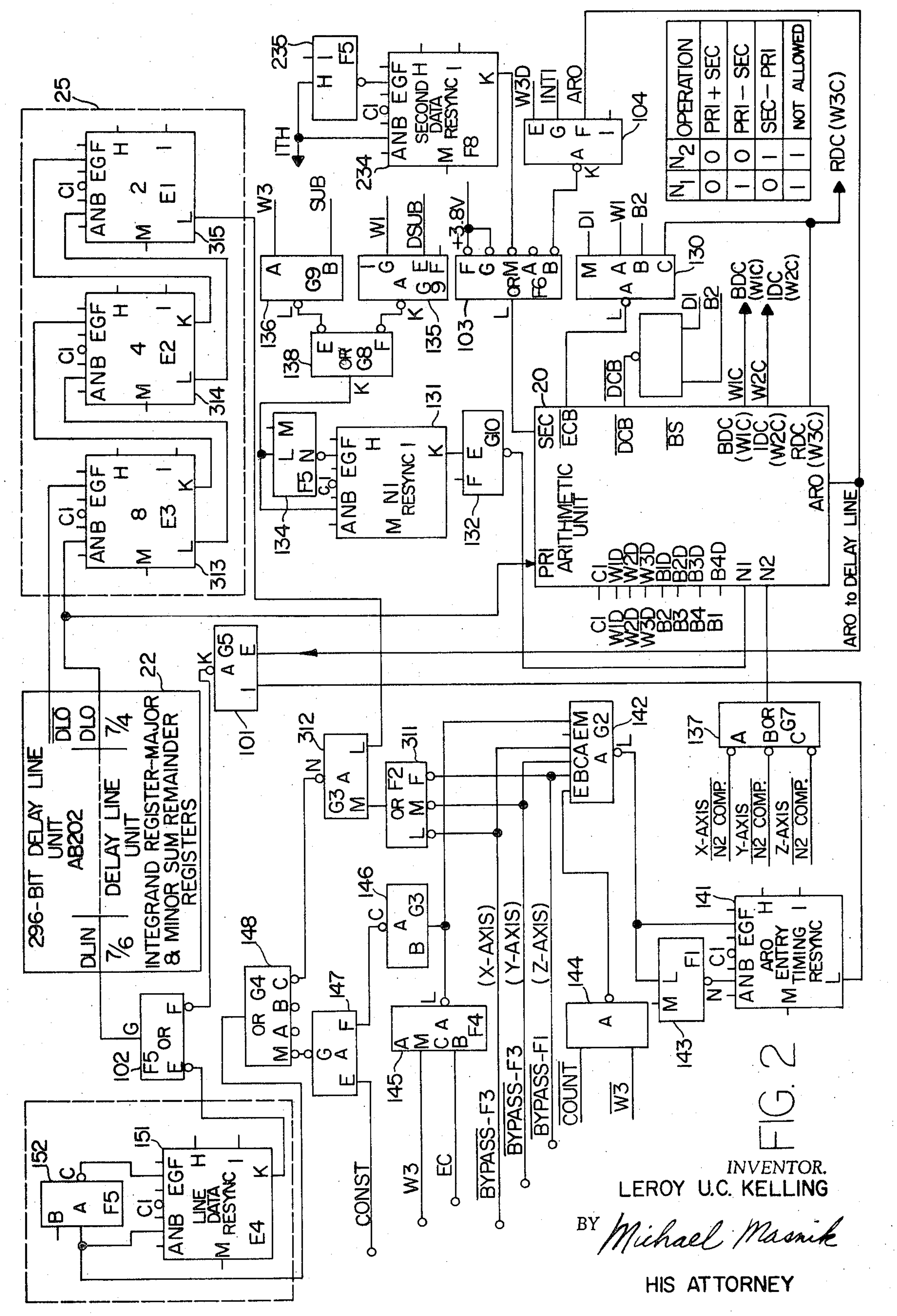
FIG. 2 is a detailed logical circuit diagram of the arithmetic processing gating circuitry employed in the conversion apparatus shown in FIG. 1.

FIG. 2 of the drawings is a detailed logical circuit diagram of most of the arithmetic processing circuit means 19 shown in dotted outline form in FIG. 1 of the drawings. The arithmetic processing circuit means is comprised by a closed loop, serially connected arithmetic unit 20 and delay line unit 22. The construction and operation of the arithmetic unit 20 is set forth in greater detail in the above identified copending U.S. application Ser. No. 709,386, John T. Evans, and the delay line unit is of conventional serial shift register construction. The delay line unit provides 296 bits of delay, and its output labeled PRI is supplied to the PRI input of the arithmetic unit 20. The output of the arithmetic unit labeled ARO delayed 4 bit times behind its input and is supplied back up through a four input AND gate 101 whose output in turn is supplied through a two input OR gate 102 back to the input terminal labeled DLIN of the delay line unit 22.

Figure 8:
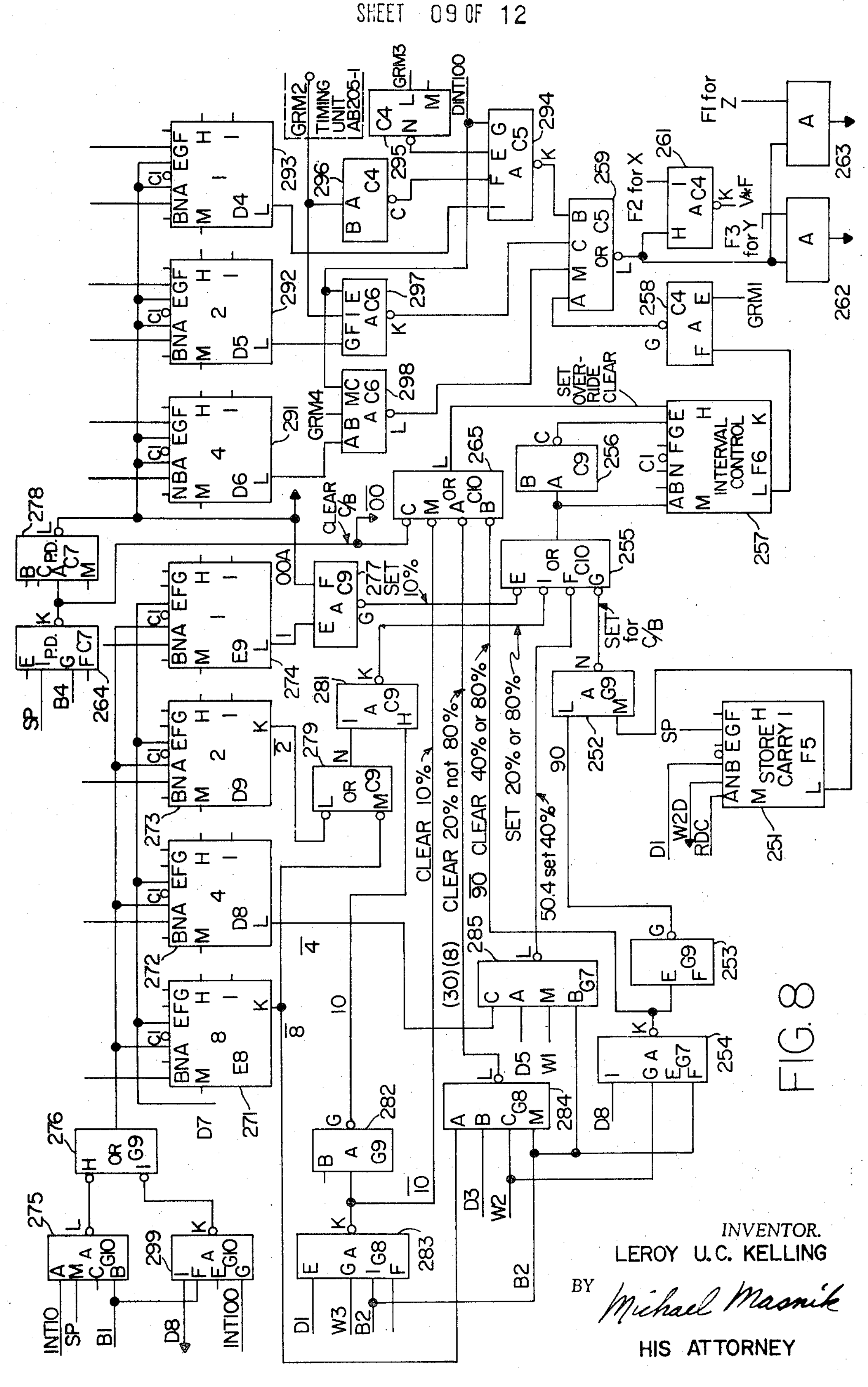
FIG. 8 is a detailed logical circuit diagram of a new timing interval control circuit for converting the digitized count coming from the multiply scaled conversion apparatus into a timing interval control gating signal that is suitable for developing a phase analog signal proportional to the digitized count.
Figure 9:
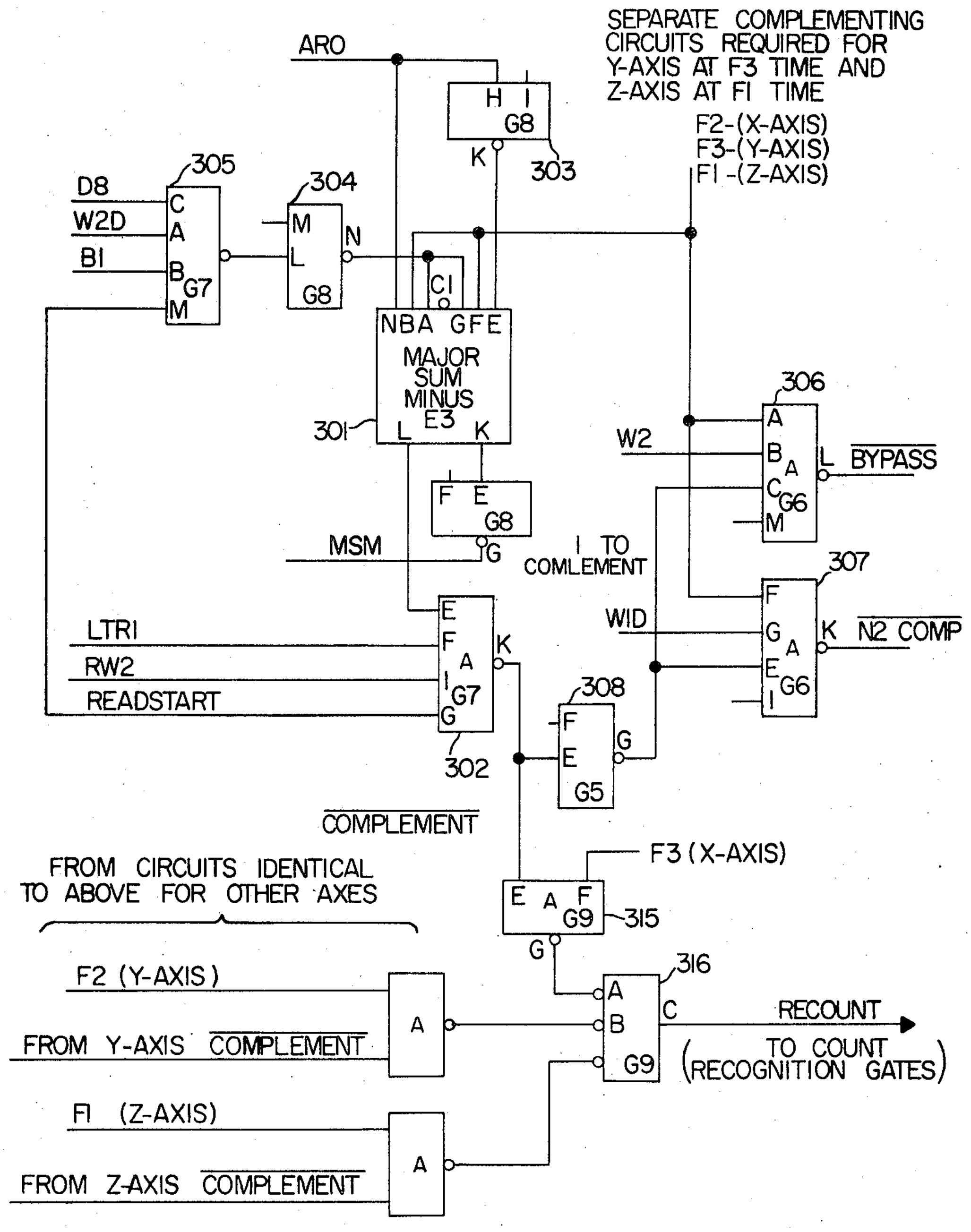
FIG. 9 is a detailed logical circuit diagram of a readout circuit arrangement for reading out the accumulated count in the minor and major sum register, and for complementing negative numbers during the readout operation.
Figure 9:
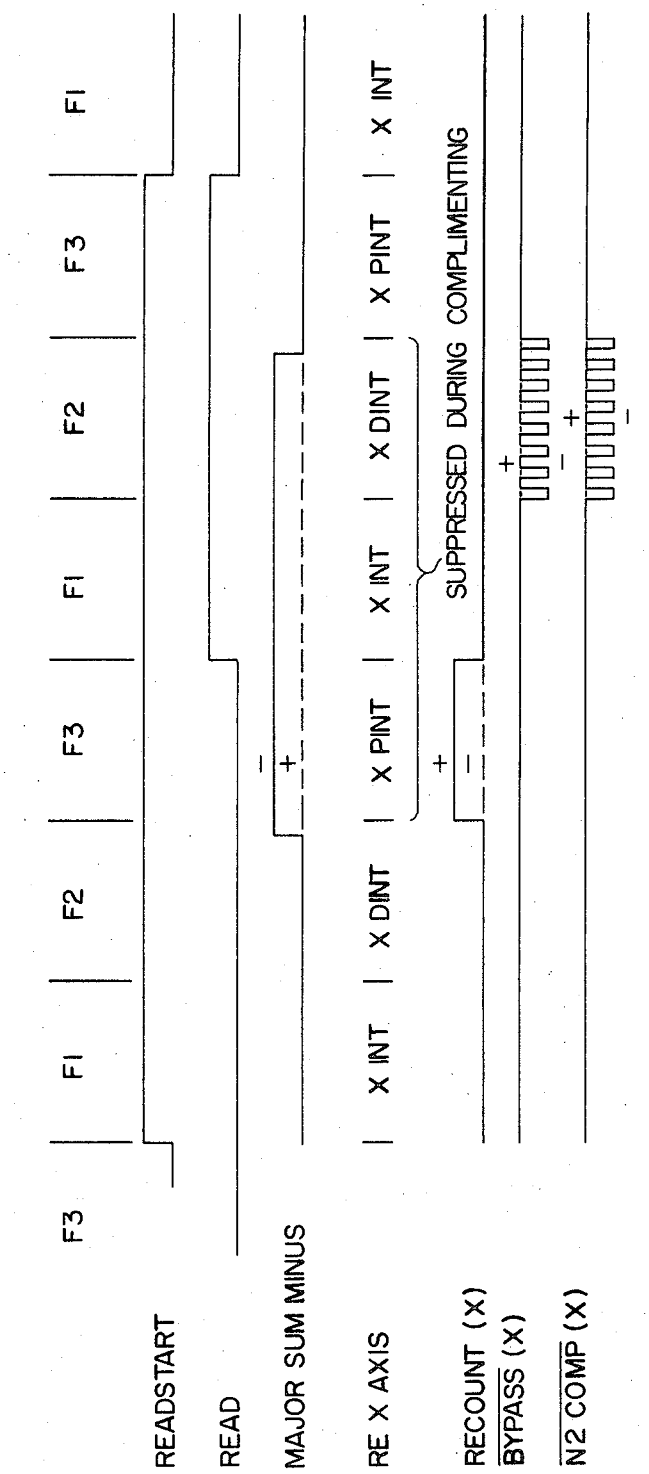
Figure 10:
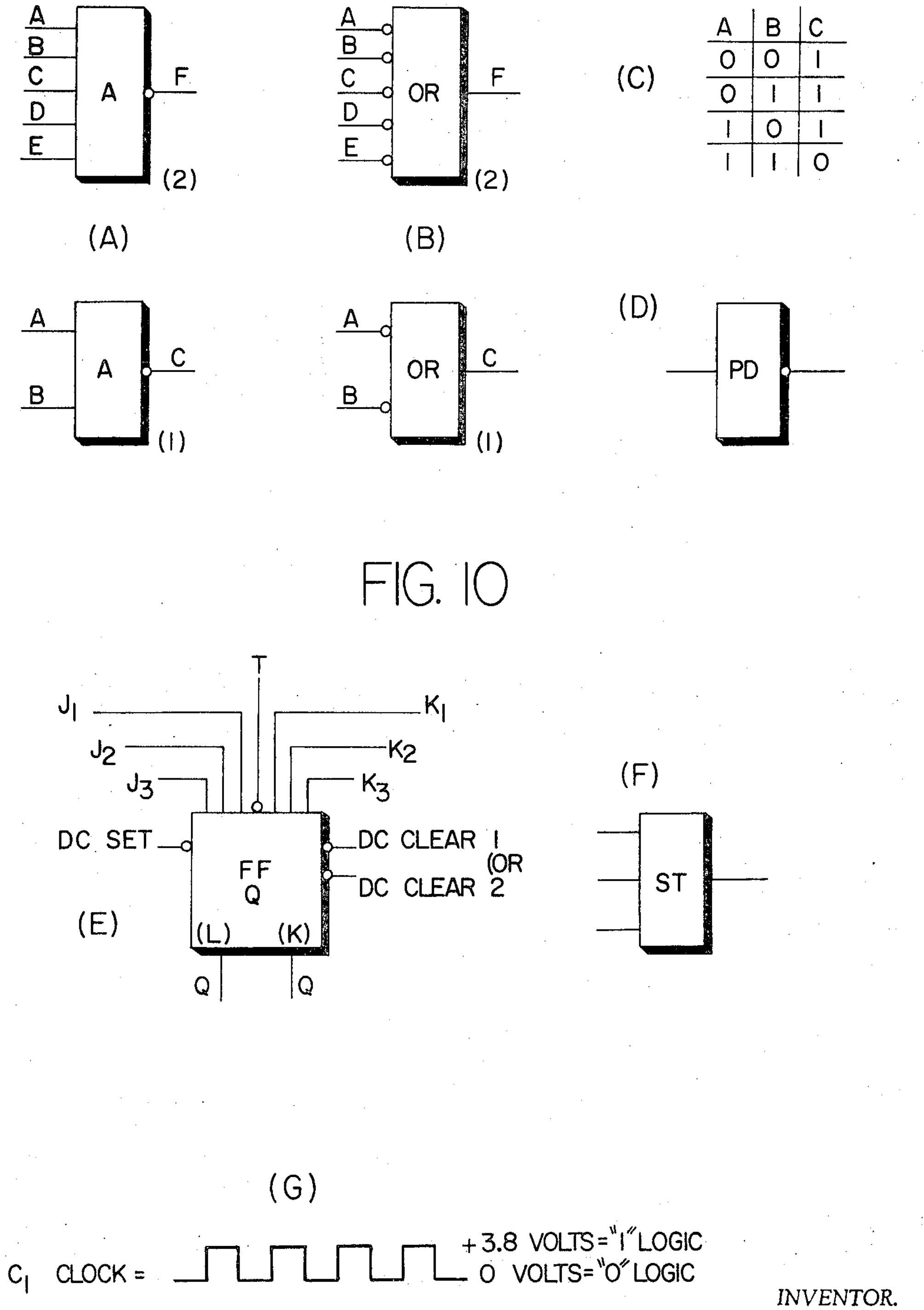
FIGS. 10(A) through 10(G) illustrate the logical circuit element symbology along with associated truth tables and wave forms employed in depicting the several circuit elements that comprise the circuits shown in FIGS. 2–9.

FIG. 10 of the drawings is a schematic illustration of the symbology employed in the detailed logical circuit diagrams shown in FIGS. 2–9. FIG. 10A (1 and 2) illustrates the symbols employed for AND gates wherein FIG. 10(A) (1) is a two input AND gate and FIG. 10(A) (2) is a five input AND gate. These symbols are employed to denote an AND gate although the number of inputs to the gate may vary. While these gates are called AND gates, they are in fact inverting AND gates which cause an inversion of the input signals supplied thereto. All AND gates to be permissive must have logic "1" (+3.8 volts) enabling signals supplied to all their inputs in order to provide a logic "0" output signal (0 volts). These characteristics are present regardless of the number of input terminals to the AND gate. FIG. 10(C) of the drawings is a truth table for the two input AND gate shown in FIG. 10(A) (1). From an examination of this truth table it will be seen that there is an inversion produced by the gate between the input and output terminal which is depicted by a small circle appearing at the output terminal C. The truth table for AND gates having a greater number of input terminals is essentially the same as that shown for the two input AND gate wherein to produce a logical zero "0" at the output terminal C, all of the input terminals of the AND gate must be supplied with logical one "1" input signals. FIG. 10(G) of the drawings depicts the voltage levels for both logic zero "0" and logic one "1" signals. FIGS. 10(B)(1) and (2) illustrate the logical symbols used for a two input and a five input OR gate, respectively, which is similar to the AND gates, are inverting OR gates. The truth table for the OR gates shown in FIG. 10(B)(1) and 10(B)(2) is the same as that shown in FIG. 10(C). Hence, it will be appreciated that identical circuits may be used either as an AND gate or as an OR gate depending upon the mature of the signals supplied to their inputs. All of the AND gates and OR gates employed in the present invention are of conventional construction and are generally fabricated in integrated circuit form.

Arithmetic Unit

The arithmetic unit 20 has its SEC input terminal connected to the output from a two input OR gate 103. It should be noted that the OR gate 103 actually illustrates four inputs rather than the two noted. In the following description, wherever this occurs, the additional gates not mentioned but illustrated can be assumed to conform to the convention that the input is tied to the +3.8 volt terminal bus for supplying the logic "1" level signals to these terminals. The B input to the OR gate 103 is in turn supplied from the output of a three input AND gate 104 having its F input terminal connected to the ARO output of the arithmetic unit 20 having its E input connected to timing signal W3D, and having its G input terminal connected to the INT 1 output terminal of a network of temporary storage flip-flops comprising a part of the integrate command circuitry 16 shown in greater detail in FIG. 6.

Figure 6:
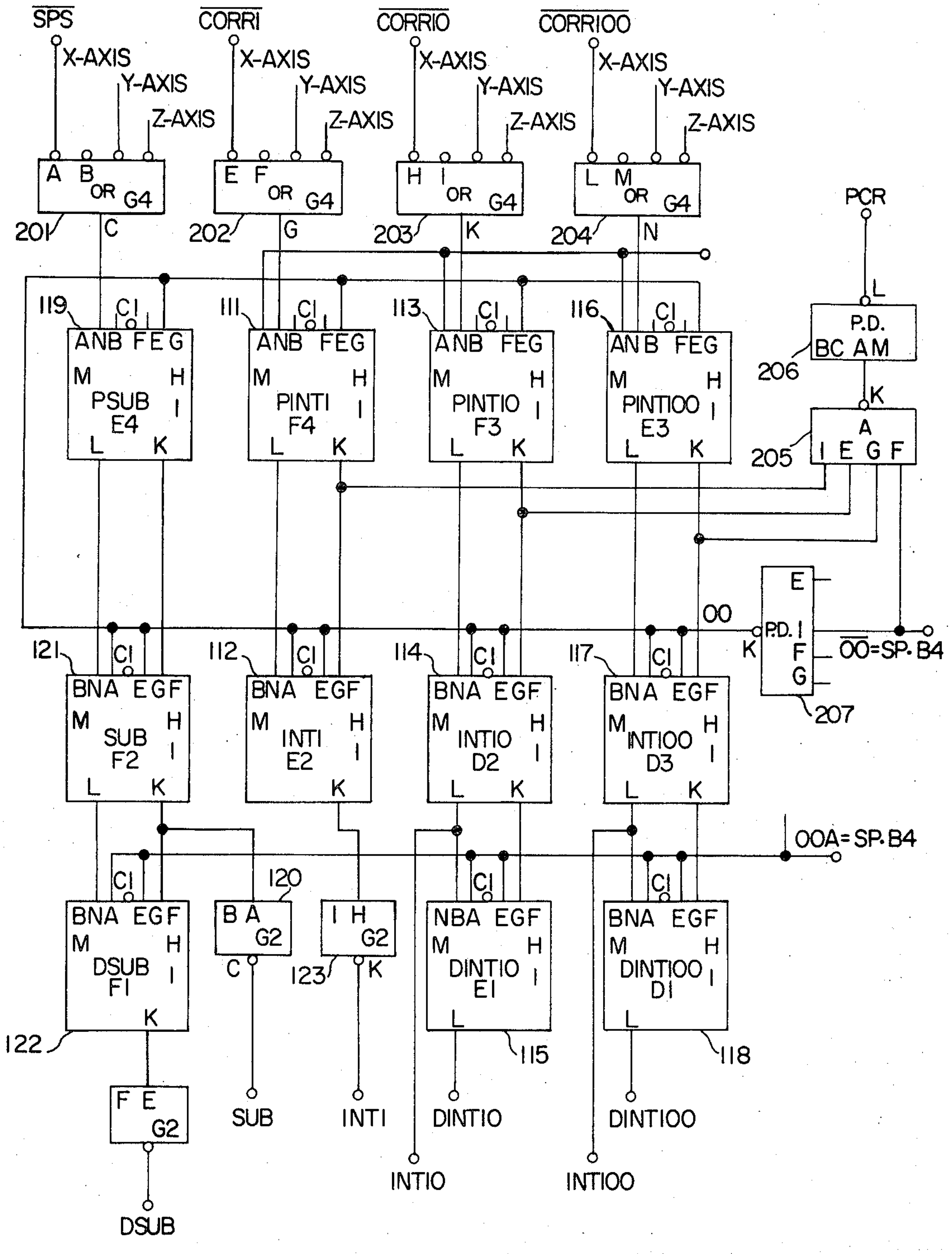
FIG. 6 is a functional block diagram of certain of the input gating circuits to the arithmetic unit, and comprise different sets of preliminary, intermediate and delayed flip-flop memory units for accumulating and reading into the arithmetic unit new input fringe count increments to be converted.

The INT 1 input signal supplied to the G input terminal of the AND gate 104 is derived from the integrate command circuitry 18 which, as is best seen in FIG. 6, is comprised by a plurality of sets of preliminary storage and intermediate and delayed working flip-flop memory circuits interconnected with each other and with the output of the reversible counter 17 for supplying input fringe count signal pulses to be converted to the input of the arithmetic unit 20. The plurality of sets of preliminary storage and intermediate and delayed working flip-flop memory circuits are designed to provide the input fringe count signal pulses in scales of unit, tens or hundreds, and further includes sign indicating flip-flop memory circuit PSUP, SUB and DSUB for supplying sign information to the N1 input of the arithmetic unit 20 to indicate that an incoming pulse count should be subtracted rather than added to the count accumulated in the minor and major sum remainder registers.

The integrate by a scale of one flip-flop memory units are comprised by the PINT-1 flip-flop 111 and INT-1 flip-flop 112; the integrate by a scale of ten flip-flop memory units are comprised by the PINT-10 flip-flop 113, the INT-10 flip-flop 114 and the DINT-10 flip-flop 115; and the integrate by a scale of one hundred flip-flop memory units are comprised by the PINT-100 flip-flop 116, the INT-100 flip-flop 117 and the DINT-100 flip-flop 118. The sign indicating flip-flops are comprised by the PSUB flip-flop 110, the SUB flip-flop 121 and the DSUB flip-flop 122. All of the flip-flops 111 through 122 are conventional J-K flip-flops as are all other flip-flops employed in the control system comprising this invention. J-K flip-flops possess the characteristic of being switched from one state to the other in response to input steering signals supplied to the SET(J) and RESET(K) input terminals thereof. Upon an enabling logic "1" potential being supplied to either the J or K input terminal, the flip-flop will switch to whichever state the input steering renders permissive at the next input clock C1 clock pulse. Switching occurs when the C-1 clock signal goes from a logic " 1" to a logic "0" level. In addition, if both the SET steering and the RESET (clear) steering are made permissive at the same time, the J-K flip-flop assumes its opposite state when triggered. FIG. 10(E) of the drawings is a schematic functional block diagram of the input connections to a J-K flip-flop. Here again if no inputs to a steering terminal are shown, it may be assumed that the terminal is tied to the logic "1" (+3.8 volt) bus. The inversion indicated at the trigger input (T) indicates that an inverted or logic "0" signal is required to trigger the flip-flop. The DC set input signal and either DC clear (OR) input signals must be inverted as shown by the inversion indicators at each of these inputs. The set steering J and the clear steering K each consists of three input AND gates. The J-K flip-flops thus comprised are standard commercially available circuit structures which can be obtained in integrated circuit form and interconnected in the manner hereinafter described to provide the functions indicated. For a detailed description of the characteristics of a J-K flip-flop reference is made to the textbook entitled "Logical Design of Digital Computers", Montgomery Phister, Author, John Wiley Publishing Company.

The INT 1 signal supplied to the G input terminal of AND gate 104 in FIG. 2 is obtained from the K output terminal of the INT 1 flip-flop 112 through the medium of an inverter power driver 123. FIG. 10(D) of the drawings illustrates the symbol employed for the inverter power driver which merely provides inversion and amplification to its single input terminal. A more detailed description of the construction and operation of the circuitry shown in FIG. 6 will be set forth at a later point in the present disclosure. For the instant purpose, it is sufficient to note that each of the several flip-flops listed serve to develop at either the set (L) or reset (K)/or both output terminals thereof a pulse count signal (in the case of the flip-flops 111 through 118), and a sign polarity indicating signal in the case of the flip-flops 119 through 122 having the identity indicated (i.e., INT 1, INT 10, DINT 10, INT 100, DINT 100, SUB and DSUB) for use in the logic circuitry to be described hereinafter. In the case of the INT 1 output signal, this signal is employed in the scale of one conversion operation and each pulse count appearing in this signal is representative of one fringe count signal input pulse from the interferometer distance measuring device. In the case of the INT 10 and DINT 10 signals, each pulse count in these signals is representative of 10 input fringe count pulses and INT 100 and DINT 100 signal pulses are representative of 100 input fringe count pulses. The manner in which these output signal pulses (INT 1, INT 10, etc.) are developed will be explained more fully hereinafter in the further description which will appear later in the disclosure.

Referring again to FIG. 2 of the drawings, it should be noted that the two input AND gate 104 has supplied to the F input terminal thereof the output signal ARO from the arithmetic unit 20. As a result of this connection, the output signal ARO can be fed back into the SEC input terminal of arithmetic unit 20 for addition to or subtraction from the signal being supplied to the PRI input terminal of the arithmetic unit from the delay line unit 22. The significance of this capability will be appreciated more fully at a later point in the description when considering the format of the integrand and minor sum remainder registers.

Figure 3B:
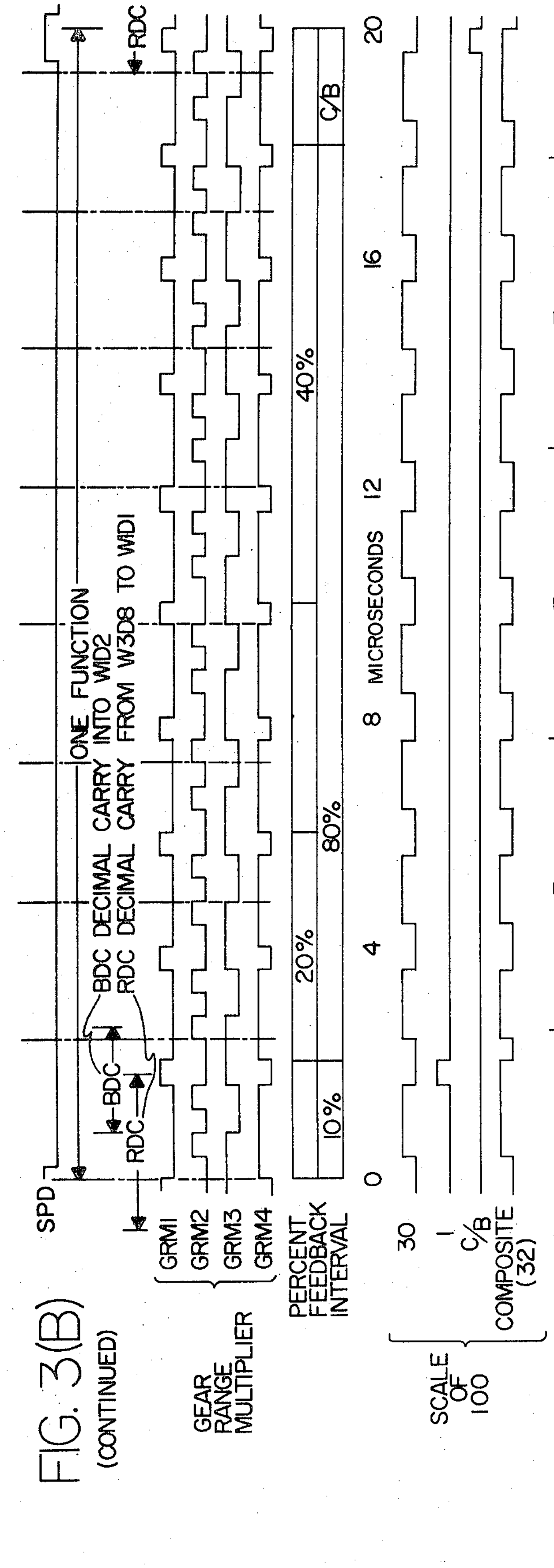
FIGS. 3(A) and 3(B) are a series of voltage versus time, timing signal waveforms employed in the operation of the machine tool control system shown in FIG. 1.
Figure 3A:
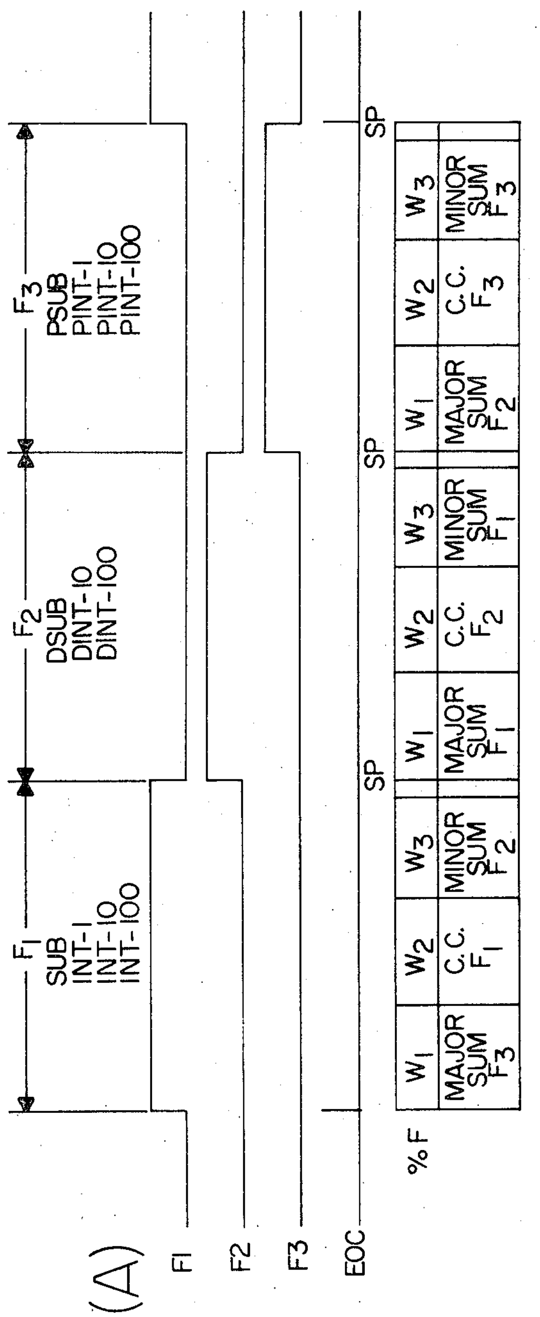
Figures 2A, 4, 5:
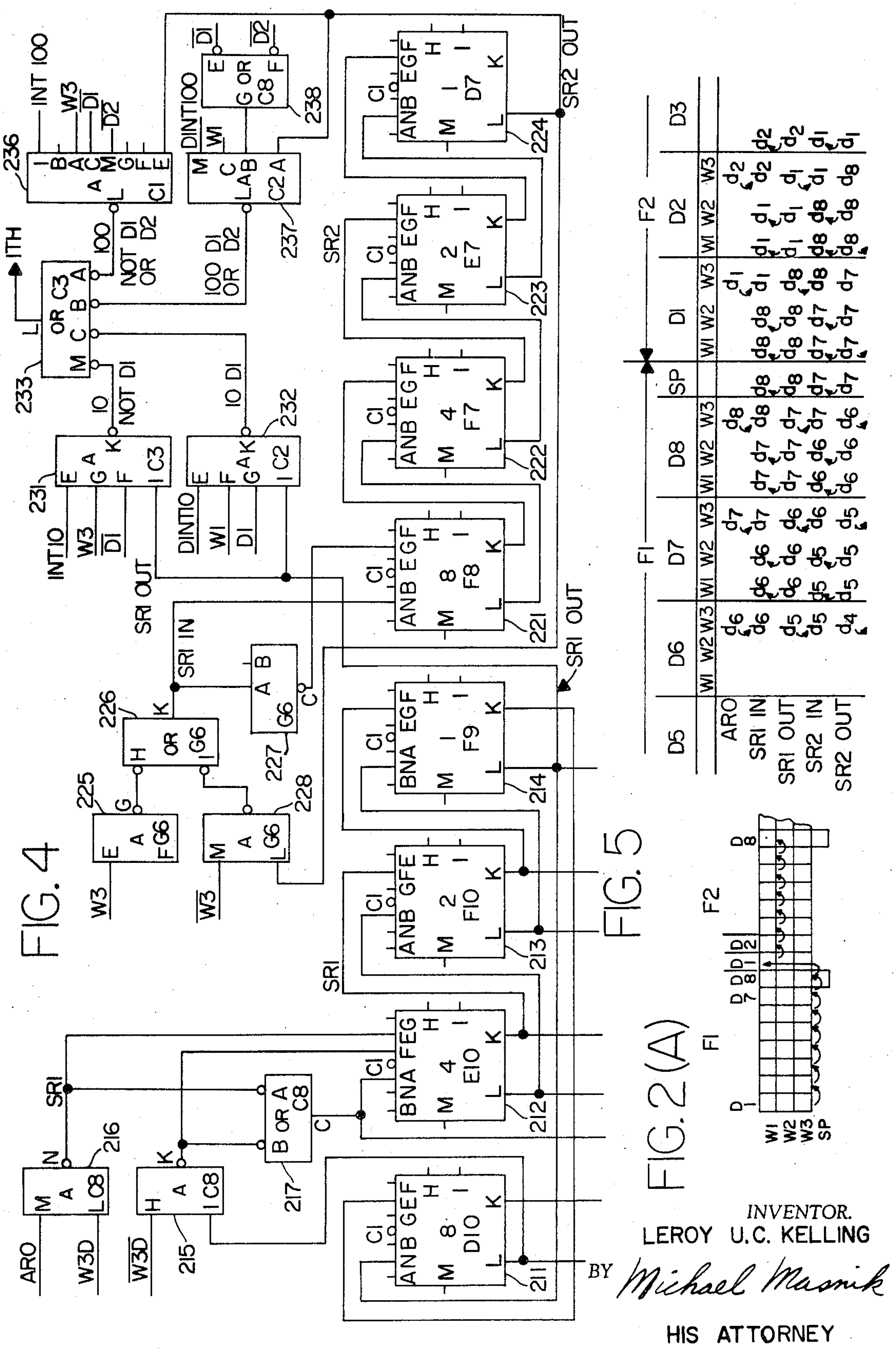
FIG. 2(A) depicts the propagation of carry signals in connection with the operation of the circuit of FIG. 2
FIG. 4 is a detailed logical circuit diagram of the construction of the delay shift registers employed in the scale of 10 and scale of 100 operating mode of the conversion apparatus.
FIG. 5 is a word shift diagram illustrating the manner of operation of delay shift registers shown in FIG. 4 and illustrating the manner in which different words are shifted through the delay shift registers shown in FIG. 4 while operating in the scale of 10 or scale of 100 mode.

At this point in the description, it is advisable to consider the nature of the digital integrator comprised by the arithmetic unit 20 and circulating delay line unit 22, and the manner in which it functions to convert from units of fringe count to units of a standard dimensional system. In essence, the conversion is achieved by making one entry of the conversion constant into an accumulation register for each input fringe count pulse in the scale of one operating mode. This accumulator register comprises two registers each of equal length to the integrand register and which are referred to as the major and minor sum remainder registers. These registers represent portions of the data circulating serially in the delay line in a manner well known in the art. The operation of the delay line to provide the register functions mentioned are illustrated by FIGS. 2(A), 3(A) and 3(B). The delay line can be a glass or wire delay line in which the acoustic pulses are entered and removed by suitable electromechanical transducers or can be a shift register of a suitable number of flip-flops shifting at the clock rate. Due to the interlaced nature of the bits, digits, words and functions, any specific register is comprised of eight separate groups of four pulses (representing a given binary coded decimal digit) which are emitted by the delay line in accordance with the timing patterns disclosed. The register is thus a certain portion of the acoustic pulses traveling through the delay medium and identifiable only be means of the bit, digit, word and function timing signals which control the circulation, modification and storage of the data in each and all of such registers. In the scale of ten operating mode, a value equal to ten times the conversion constant is entered into the accumulator register for each input pulse count supplied to the arithmetic unit 20. Similarly, in the scale of one hundred operation, one hundred times the value of the conversion constant is entered in the accumulator register for each input pulse supplied to the arithmetic unit 20. The total count accumulated in the combined minor and major sum remainder registers then is representative of the position measured by the laser interferometer. The output count pulses RDC from the digital integrator are the normal overflows (carries or borrows) from the minor sum remainder register of the digital integrator which would go to the next more significant digit of the remainder register if such existed. Each overflow thus represents a unit of distance such as 0.00001 inch or 0.0001 millimeter. The propagation of these carry signals is shown in FIG. 2A for a conversion constant in function 1(F1) time for the X-axis.

The accumulation of the overflow units could be automatically accomplished by increasing both the remainder and integrand registers by adding more significant digits adequate to register the full range of travel. In the integrand register, these added digits will be filled with zeros. Accordingly, this proposed solution would effectively double the register lengths and hence the time required to process them. Further, the zeros in the most significant portion of the integrand register perform no useful function. Therefore, it is proposed in the present invention to retain an eight decimal digit integrand and remainder register arrangement but add to it another eight decimal digit register which accepts overflows from the first remainder register and thereby acts as an extension of this register. The least significant and most significant of these registers are called the minor sum remainder register and the major sum remainder register, respectively. The simple overflow from the minor sum register to the major sum register occurs in the conversion of one or more units of fringe count per conversion cycle of the arithmetic unit 20. In the scale of ten or scale of one hundred operating mode, the conversion of ten or one hundred units of fringe count in one conversion cycle is achieved by increasing the number in the conversion constant register in magnitude by 10 or 100 times for entry into the arithmetic unit by the method of moving each digit of this constant to a time of greater significance in the serial computation. The manner in which this is accomplished will be more fully disclosed at a later point in the description.

From the above description, it will be appreciated that if there is no motion on the part of the machine tool, and there are no fringe counts to be converted, then the information stored in the integrand register (conversion constant), the minor sum remainder register and the major sum remainder register, will be circulated unchanged through the arithmetic unit and its serially connected delay line unit without additions or subtractions, and thereby keep the count accumulated in the minor and major sum register at the same value. In the event that there is a one input fringe count conversion to be made in the positive direction, then for one circulation of the arithmetic processing circuit means comprised by the serially connected arithmetic unit 20 and delay line unit 22, the number in the integrand register will be added to the minor sum remainder register in a scale of 1 to effect the change in that register and in its overflow to the major sum register by a magnitude equal to one conversion constant entry. On subsequent circulations, if there are no further input fringe count pulses, the information will continue to be circulated through the digital integrator without change by the timing signals supplied to the system from the timing unit 37. If a correction is to be made for one input fringe count pulse in the down scale or negative direction, then for one circulation the number in the integrand register is subtracted from the number in the minor sum register and carried over into the major sum register if necessary. The conversion apparatus is capable of converting one input fringe count pulse on each of three axes each 60 microseconds thereby obtaining a conversion rate of approximately 3 microinches 16,667 times per second which is the equivalent of a machining rate of about 3.0 inches per minute. For higher speeds, it is necessary to convert in larger units such as units of 10 or 100, by operating the conversion apparatus in the scale of 10 and scale of 100 modes.

Figure 3B:
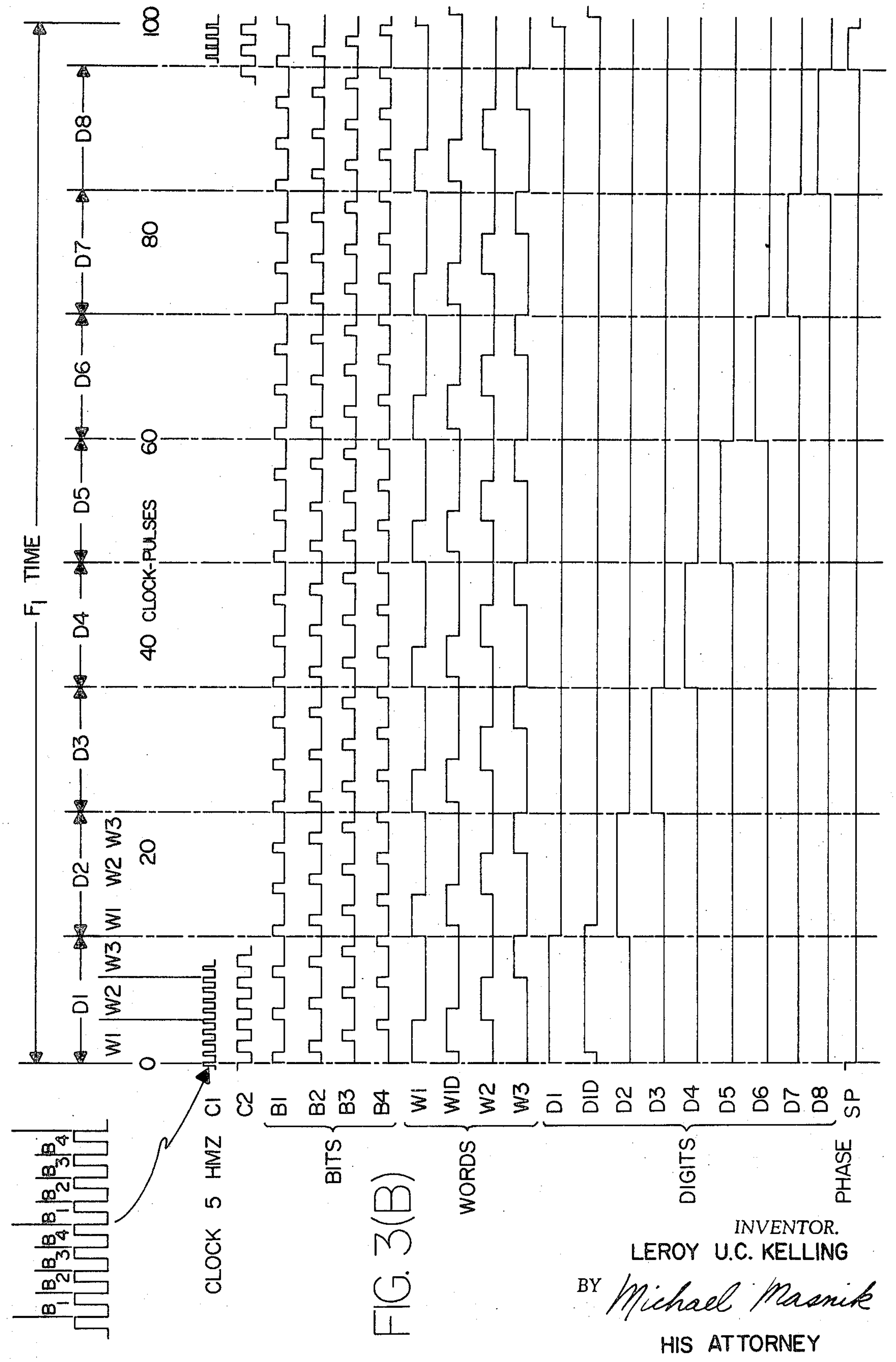

The timing signal waveforms of the timing signal employed in the operation of the equipment are illustrated in FIG. 3 of the drawings. The timing wave shapes shown in FIG. 3(A) and labeled F1, F2 and F3 represent the function timing wave shapes where function 1 (F1) is the timing signal that is active during conversion processing of the X axis fringe count input pulses, function 2 (F2) is the timing signal that is active during the conversion processing of the Y axis fringe count input pulses and function 3 (F3) is the timing signal that is active during the conversion processing of the Z axis fringe count input pulses. At the end of function 3 (F3) an end of circulation signal pulse, identified as EOC, is produced to indicate the completion of one circulation of all three functions through the closed loop, serially connected arithmetic unit 20 and delay line unit 22 comprising the digital integrator. In the processing of computations for the X axis with its conversion constant in word 2 (W2) of function 1 (F1), the labels SUB, INT 1, INT 10 and INT 100 indicate that these timing signals are active during function 1 (F1) time; DSUB, DINT 10, DINT 100 are active during function 2 (F2) time; and PSUB, PINT 1, PINT 10 and PINT 100 are active during the preceding function three (F3) time. The same labels are shifted 1 and 2 function times respectively for the processing of the computations for the Y and Z axes having conversion constants in word 2 of functions 2 and 3 respectively. Each function time occupies one hundred clock bits as is shown more clearly in FIG. 3(B) of the drawings. Each function is also divided into three words, word 1, word 2 and word 3 with each word occupying 32 bits or one-third of the function time as shown in the diagram marked percent F(%F) in FIG. 3(A). In addition to the three words each function includes a space at the end of the function time marked SP that occupies four clock bits. Since the delay line unit occupies 296 clock bits, and the arithmetic unit occupies four clock bits, the closed loop serial digital integrator as a system utilizes 300 clock bits divided into three functions with each function occupying 100 clock bits and includes a spacing signal SP of four clock bits. The word format depicted by the percent F (%F) diagram in 3(A) does not accurately depict the word format since in actuality the words are interlaced into the decimal digit spacing in a manner to be described more fully hereinafter. The percent F diagram (%F) shown in 3(A) does illustrate however that each function is essentially divided into three words.

For a reason that will become more apparent hereinafter, the digital integrator integrand register and the minor and major sum remainder registers are assigned word and function times as follows. It will be remembered from the above that the conversion constant is stored in and comprises the integrand register of the digital integrator, and is assigned to word 2 times in each of the functions. Thus the conversion constant for function 1 (F1) appears at word 2 function one time (W2,F1), the conversion constant for function 2 (F2) appears at word 2 function 2 time (W2, F2) and the conversion constant for function 3 appears at word 3 function 3 time (W3, F3). The minor sum remainder register is assigned to the word 3 time of each of the functions and thus the minor sum of function 1 appears at word 3 function 1 time (W3, F1), the minor sum remainder register for function 2 appears at word 3 function 2 time (W3, F2) and the minor sum remainder register for function 3 appears at word 3 function 3 time (W3, F3). The major sum remainder register for each of the functions are interlaced into the next succeeding function time however, so that the major sum remainder register for function 1 appears at word 1 function 2 time (W1, F2), the major sum remainder register for function 2 appears at word 1 function 3 time (W1, F3) and the major sum remainder register for function 3 appears at word 1 function 1 time (W1,F1). By this arrangement, it becomes possible to fully complete all of the conversion processing operations required to update the count accumulated in the minor sum and major sum remainder registers in substantially only one complete circulation of the arithmetic processing circuit means comprised by the closed loop, serially connected delay unit 22 and arithmetic unit 20.

FIG. 3(B) of the drawings illustrates the manner in which the three words that comprise a function (that is to say, the data that comprises the conversion constant, the minor sum remainder register and the major sum remainder register) are interlaced to form the eight decimal digits labeled D1 through D8 that make up the binary coded decimal digital value being accumulated in the minor sum and major sum remainder registers for readout to the readout shift register or for use in the further control of the machine tool. In this array, the decimal digits D1 through D8 are synchronously circulated through the arithmetic processing circuit means one bit at a time by the clock timing signal C1 supplied from the timing unit. Thus, if the arithmetic unit 20 is assumed to be the reference point, then during each function time decimal digit D1, which is the decimal digit of least significance, is circulated through the arithmetic unit which serially accepts and processes four bits at a time, and provides a four bit delay between its input and output. As stated in the preceding paragraph, the conversion constant is stored in word 2 and the minor sum remainder register is stored in word 3. Hence, with the above word interlace arrangement, at the time that word 3 of digit 1 is entering arithmetic unit 20 through input terminal PRI from the delay line unit 22, the conversion constant stored in word 2 of the same decimal digit is emerging as output signal ARO of the arithmetic unit and simply may be recirculated back through the two input AND gate 104 and the two input OR gate 103, back into the SEC input terminal of the arithmetic unit for addition to or subtraction from the minor sum remainder register. Any overflows from the minor sum remainder register to the major sum remainder register due either to carries or borrows are supplied back through a feedback path as signal RDC, and through a three input AND gate 130 for reinsertion into the arithmetic unit 20 as the electronic carry borrow signal ECB. Whether or not the conversion constant is added to or subtracted from the minor sum remainder register during a particular conversion operation by arithmetic unit 20 is determined by the signal level at the input terminal N1. If there is an input enabling signal (logic "1") present at the input terminal N1, the SEC value will be subtracted from the PRI value. In the absence of a logic "1" signal at the N1 input terminal, the two values will be added.

Returning again to the timing diagram shown in FIG. 3(B) of the drawings, it will be appreciated that in the event that there is a carry or borrow overflow value from the minor sum remainder register into the major sum remainder register, this fact will not be determined until all of the decimal digits of the minor sum remainder register have been processed. For example, if there is an overflow borrow or carry from the arithmetic unit conversion operation on word 2 and word 3 of digit 1, any such overflow value will have to be carried into the conversion operation in connection with the next most significant decimal digits, namely decimal digit D2, and so on down the line until the most significant decimal digit in the minor sum remainder register has been processed. Then it will be determined whether there is an overflow carry or borrow value to be added to the major sum remainder register. It is for this reason that the major sum remainder register for each function is located in word 1 of the next succeeding function. This arrangement allows the overflow carry or borrow value determined from the conversion processing of the conversion constant with the minor sum remainder register values to be added to or subtracted from the major sum remainder register in one complete circulation of all three functions (300 bits of data) through the arithmetic processing circuit means. Other possible arrangements would otherwise require two circulations through the arithmetic processing means in order to completely update the count accumulated in the minor sum and major sum remainder registers and consequently slow down the conversion processing operations. At this point in the description, it would be well to note the distinction between a single conversion operation of the arithmetic unit 20 (which is four bits long) and a complete circulation of the data stored in the digital integrator comprised by the closed loop, serially connected arithmetic unit 20 and delay line unit 22, which complete circulation is 300 clock bit times in duration.

In order to carry over any overflow carry or borrow values from one decimal digit into the next most significant decimal digit, the arithmetic unit 20 is designed to include carry/borrow circuitry for accomplishing this object. For a more detailed description of this carry/borrow circuitry, reference is made to the above-identified copending Evans application Ser. No. 709,386. Briefly, however, the circuitry includes three binary/decimal carry/borrow flip-flops which follow the input carry/borrow signal output from the AND and OR logic circuits that process the incoming PRI and SEC signals supplied to the arithmetic unit. These binary/decimal, carry/borrow flip-flops are steered by word select signals that correspond to the word signals W1, W2 and W3 shown in FIG. 3, and are actuated in sequence so as to generate and hold the decimal part of the carry/borrow signals from the most significant bit of a lesser significant decimal digit until the least significant bit of the next more significant digit of each word. Accordingly, it will be appreciated that the carry/borrow circuitry of the arithmetic unit operates to provide the necessary decimal carry into the next most significant digit. Thus, during function one (F1) time, the conversion constant will be added to the minor sum remainder register during W3 time serially with any decimal carry/borrow being carried over into the next most significant decimal digit of the minor sum remainder register by the arithmetic unit. Subsequently, during function 2 (F2) time any carry/borrow value to be added to the major sum remainder register from the minor sum remainder register is supplied through the RDC connection back through the three input AND gate 130 to the external carry/borrow input terminal ECB of the arithmetic unit where it is added to the least significant digit of the major sum remainder register during word one bit one delayed time (W1,B1D). Subsequently, any carry/borrow values from the least significant digit of the major sum remainder register will be carried over and added to the next most significant decimal digit in that register so that at the end of function 2 (F2) time the total count accumulated in the minor sum and major sum remainder registers for function 1 (X axis) will be completely updated. In a complete circulation of the arithmetic processing circuit means, all functions will be updated in a similar fashion.

From a consideration of the above description in conjunction with FIG. 3(B) of the drawings, it will be appreciated that each group of four consecutive bit times define the decimal digit value for a particular word, and that the four binary bits of BCD coded decimal digits of like significance are alternated between three words known as word 1, word 2 and word 3. As stated earlier the value of the conversion constant is stored in word 2, the value of the minor sum remainder register is stored in word 3 and the value of the major sum remainder register of the preceding function is stored in word 1. After each group of eight decimal digits in each of three words, a space character consisting of four bit times is employed to make 100 bit times the total for each function. The three functions known as function 1, function 2 and function 3 follow in order before each recirculation wherein each function is assigned a separate axis such as the X, Y and Z axes of a machine. At a clock frequency of 5 megahertz, the processing time for each function is 20 microseconds, with 60 microseconds required for each circulation of all three functions through the digital integrator.

Referring again to FIG. 2 of the drawings, the arithmetic unit 20 has two other major control inputs identified as N1 and N2 which respectively cause the arithmetic unit to subtract the SEC input from the PRI input for the N1 signals, and to subtract the PRI input from the SEC input for the N2 input signals. In the absence of signals supplied to either the N1 or N2 terminals, the PRI and SEC inputs are added by the arithmetic unit. In addition to the major control inputs, there are a series of timing signal inputs such as C1, W1D, W2D, etc. which are supplied to the arithmetic unit as timing input signals and have the relative timing relations illustrated in FIG. 3(B) of the drawings. These timing signals enable the above described arithmetic processing operations to be carried out.

The N1 input terminal to the arithmetic unit 20 is enabled by a signal supplied from an N1 RESYNC flip-flop 131 shown in FIG. 2 whose K output terminal is connected to the N1 input terminal through a power driver inverter 132. The N1 RESYNC flip-flop 131 normally is in its cleared condition so that the logic 1 signal appearing at its K output terminal will be inverted by the power driver 132 and appears as a zero logic level signal at the input terminal N1. The N1 resync flip-flop 131 is triggered to its set condition by the application of an enabling potential to its set and reset steering gates following the next C1 clock pulse. As stated earlier, all flip-flop memory elements employed in the equipment comprising the present invention are J-K flip-flops unless otherwise noted, so that upon application of an enabling potential to both of its steering gates, the flip-flop will be triggered to its opposite state at the time that the C1 clock input goes from logic "1" to logic "0". The enabling steering potential is derived from a two input OR gate 133 whose output is connected directly to the set (J) steering gate of N1 RESYNC flip-flop 131 and is connected through the power driver inverter 134 to the reset (K) steering gate. The OR gate 133 in turn has its F input terminal connected to the output from a two input AND gate 135 which has its two inputs connected to a word 1 timing signal (W1) and its remaining input terminal connected to the DSUB output of the integrate command circuitry shown in FIG. 6 of the drawings. The E input terminal of OR gate 133 is connected to the output of a two input AND gate 136 having one of its input terminals connected to the SUB output of the integrate command circuitry shown in FIG. 6 and its remaining input terminal connected to the word 3 (W3) timing signal. By this arrangement, upon the appearance of a SUB input signal at word 3 (W3) time, or alternatively a DSUB input signal during word 1 (W1) time, the N1 RESYNC flip-flop 131 will be triggered from its cleared to its set state so as to provide an enabling potential to the N1 input terminal of the arithmetic unit 20. With the N1 input terminal thus enabled, the arithmetic unit 20 will then operate to subtract the SEC input signal from the PRI input signal.

The N2 input terminal of arithmetic unit 20 is connected to the output from a three input OR gate 137 whose three inputs are connected to the $\overline{\text{N2 COMP}}$ signal output for each of the X, Y and Z axes. The manner in which the $\overline{\text{N2 COMP}}$ signal is developed will be described more fully hereinafter in connection with FIG. 8 of the drawings. Upon appearance of any of the X axis, the Y axis or the Z axis $\overline{\text{N2 COMP}}$ signal at the input of OR gate 137, an enabling potential will be applied to the N2 input of arithmetic unit 20 to cause the unit to subtract the PRI input signal from the SEC input signal which is zero during this complement operation.

As stated earlier in the description, the ARO output of the arithmetic unit 20 is supplied back through one of the input terminals of a two input AND gate 101 and through an OR gate 102 to the input terminal of the delay line unit 22. The second input terminal of AND gate 101 is enabled from the set output terminal of an ARO entry timing RESYNC flip-flop 141 which in turn is controlled by the output from a five input AND gate 142. The output from AND gate 142 is applied directly to the reset steering terminal of flip-flop 141, and is applied through a power driver inverter 143 to the set steering terminal of the flip-flop. The five input AND gate 142 has three of its input terminals connected to the $\overline{\text{BYPASS}}$ output for each of the X axis, Y axis and Z axis. These signals are normally present at a logic one level except during a readout complementing operation of the arithmetic processing circuit which will be described later. A fourth input terminal to the AND gate 142 is connected to the output of a two input AND gate 144 whose inputs have supplied thereto a $\overline{\text{COUNT}}$ signal and $\overline{\text{W3}}$ signal. The $\overline{\text{COUNT}}$ signal is derived from a reset count flip-flop (not shown) which enables the gating circuit to clear the count accumulated in the minor sum and major sum remainder registers without clearing the conversion constant stored in the integrand register. This clearing operation is accomplished during word 1 (W1) and word 3 (W3) times. The fifth input terminal of AND gate 142 is supplied from the output of a two input AND gate 145 which has one of its input terminals supplied from the word 3 (W3) timing signal and the remaining input signal supplied from an enabling potential identified as EC for entering a new conversion constant value in the integrand register as will be described more fully hereinafter.

The function of the above described arithmetic gating circuitry will be described in the following paragraph, however, for the present purposes it will be noted that normally an enabling potential will be applied from this circuitry to the fifth input terminal of AND gate 142 unless and until it is desired to reenter a new constant value in the remainder register at word 2 (W2) time. The design of the circuit is such that the ARO entry timing resync flip-flop 141 is in its set state so that an enabling potential is supplied from its L output terminal to the I input terminal of AND gate 101. Thus, the AND gate 101 normally is enabled to allow reentry of the ARO data back through OR gate 102 into delay line unit 22 in serial closed loop fashion. Upon initially placing the equipment in operation, or subsequently if it is desired to start a new count accumulating in the remainder registers, the count flip-flop (not shown) is activated so as to supply a clearing count at word 3 (W3) time through AND gate 144. This will result in resetting the ARO entry timing resync flip-flop 141 so that the data stored in the minor sum and major sum remainder registers is prevented from reentering the delay line unit by AND gate 101 and the minor and major sum remainder registers are cleared of any data stored therein.

Conversion Constant Entry

Upon initially placing the equipment in operation, or if at some subsequent time, it is desirable to change the value of the conversion constant stored in the integrand register, the circuitry including AND gate 145 is employed for this purpose. As stated previously, AND gate 145 has the W3 timing signal supplied to one of its inputs and an enter constant enabling signal EC supplied to the other. Upon the appearance of the enter constant EC signal during word 3 (W3) time, the output of AND gate 145 goes to logic zero ("0") level and operates through AND gate 142 to reset the ARO entry timing resync flip-flop 141 to thereby block reentry AND gate 101. It will be remembered that at the time of word 3, word 2 will be emerging from the output of arithmetic unit 20 as the ARO signal due to the four bit delay introduced by the arithmetic unit. Accordingly, the value of the conversion constant previously stored in word 2 will be blocked by AND gate 101 and prevented from being reentered into the delay line unit 22 at the appropriate point.

Concurrently with this blocking function, the output of AND gate 145 is supplied through an inverter power driver 146 to one of the inputs of a two input AND gate 147 which has its output supplied through a two input OR gate 148. The two input AND gate 147 has its remaining input terminal connected to the output of a store conversion constant shift register whose output is identified as CONST. The input signal CONST represents in binary form the new value of the conversion constant to be entered into the delay line unit 22. Accordingly, AND gate 147 will be enabled to pass this new value of the conversion constant up to the OR gate 148. The output of OR gate 148 is supplied directly to the set steering terminal of a line data resync flip-flop 155 (E4) and through an inverter power driver 152 to the reset steering terminal of flip-flop 151. The line data resync flip-flop 155 serves to reshape and resynchronize the conversion constant data being read in through AND gate 147 and OR gate 148 before supplying the same through OR gate 102 to the input of the delay line unit 22. The line data resync flip-flop 151 also serves another function as a part of a four bit bypass shift register which will be described further hereinafter in connection with the readout complementing operation of the equipment.

Figure 7:
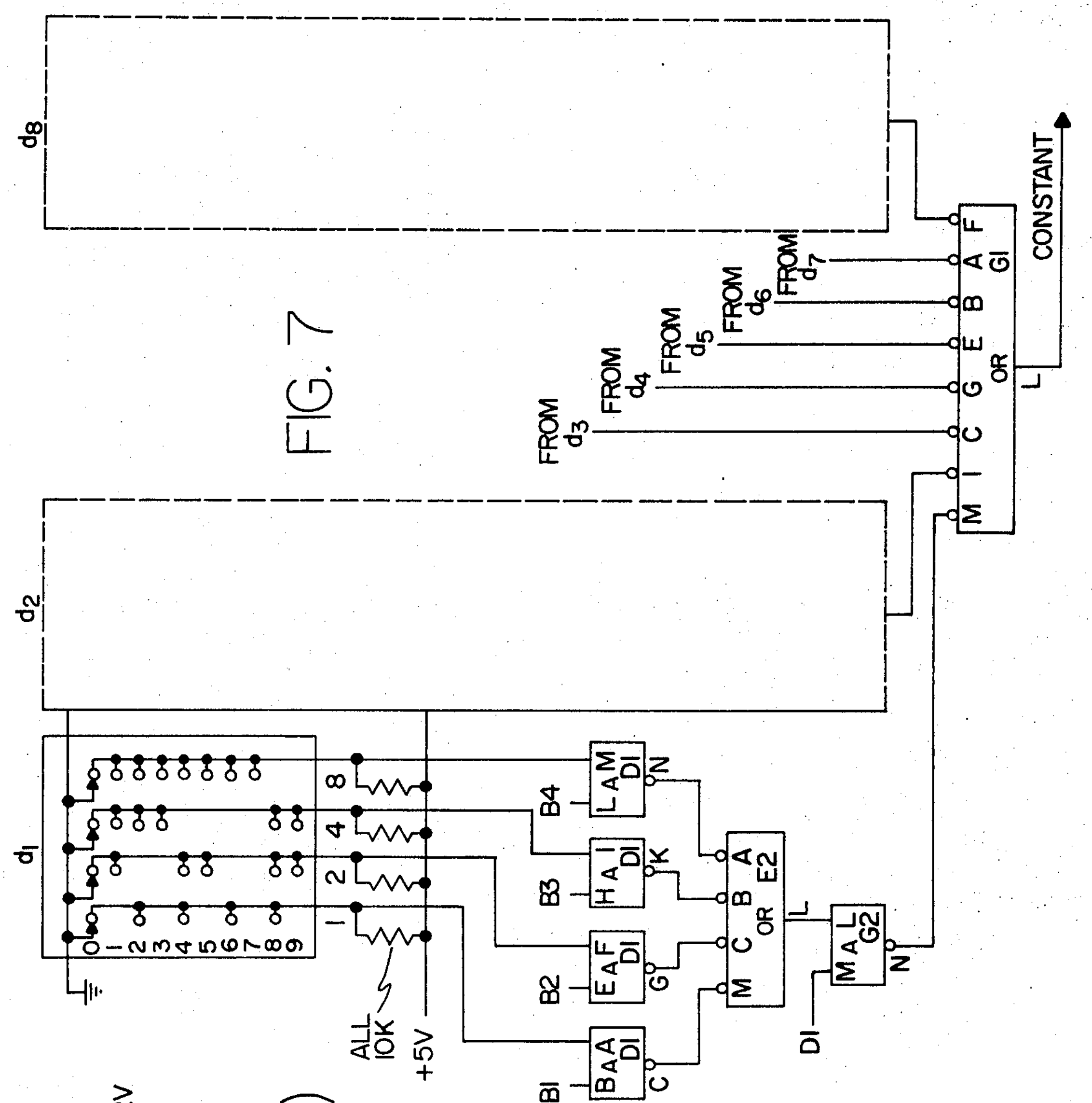
FIG. 7 is a detailed logical circuit diagram of a conversion constant register and readout scheme used selectively reading in new values of the conversion constant into the integrand register of the digital integrator.

FIG. 7 of the drawings is a detailed logical circuit diagram of a conventional, serially readout, eight decimal digit switchable register for storing the values of the conversion constant to be entered into the delay line in the above-described fashion. This register operates at the C1 clock frequency to produce at the output terminal of an eight input OR gate the data signal CONST employed in writing the conversion constant into the delay line unit 22. The values of the conversion constant for each decimal digit may be initially entered through the medium of a plurality of decimal coded binary, four bank switches, there being a four bank switch for each of the decimal digits D1 through D8. The values entered in each bank of the decimal switches operate through a four input OR gate upon being scanned at the C1 bit or clock frequency to develop at its respective output terminal during a particular digit time (for example D1 time) a binary coded four bit signal indicative of the decimal digit value stored in that particular four bank stepping switch. The output of all of the four bank switches are serially read out by the respective digit timing signals D1, D2 etc., to thus produce the desired output CONST signal in a manner which is properly synchronized with the C1 clock frequency and with the function, word and digit format of the data circulating in the delay line unit 22.

The data read into each of the four bank switches (such as D1) may be placed in the switch unit manually by an operator, or if desired these switches may be stepping switches in which the contactors of these units may be positioned automatically in response to sensor equipment that senses ambient operating conditions, and automatically changes the value of the conversion constant in response thereto at appropriately timed intervals. While mechanical switches have been shown as the means for setting new conversion constants values into the shift register, it is believed obvious that electronic counters or registers could be readily substituted in their place. The need for making such adjustments to the value of the conversion constant is described more fully in the above referenced copending application Ser. No. 709,387 of L. U. C. Kelling, filed concurrently with this application.

Figure 7A:
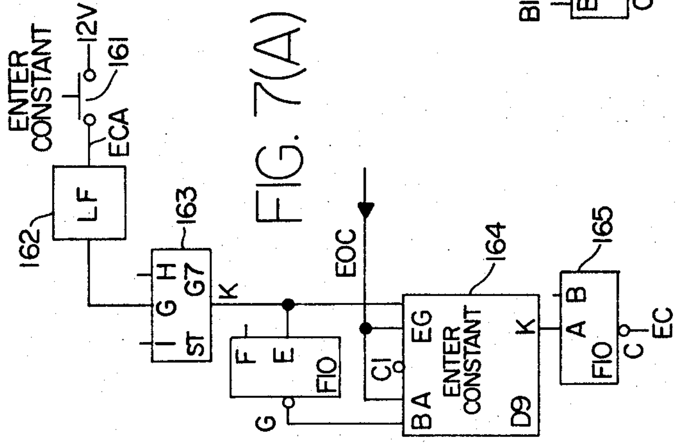

From the above description, it will be appreciated that the timing of the entry of a new conversion constant into the delay line unit is somewhat critical. FIG. 7(A) of the drawings illustrates the circuitry required to properly synchronize entry of the new conversion constant data into the delay line unit at an appropriate point in the circulating data being recirculated through the delay line unit and arithmetic unit 20. This circuitry includes an enter constant pushbutton switch 161 which may be manually or automatically operated and serves to connect one side of a minus 12 volt terminal bus through a line filter unit 162 and a steering flip-flop 163 to activate the steering input terminal of an enter constant flip-flop 164. The enter constant flip-flop 164 has two input AND gates supplying its set and reset steering input terminal to which a timing signal identified as EOC is supplied. Thus, upon pushbutton switch 161 being depressed, the enter constant flip-flop 164 is only partially enabled, and is not fully switched from its cleared to its set condition until such time that the enabling signal EOC is applied. The enabling signal EOC is obtained from the EOC output terminal of the timing unit 37. It should be noted at this point that the EOC signal is a timing signal occurring during the last bit time of function 3 (F3) to indicate the end of circulation of each complete circulation of the data through the delay line register. At this point then, the enter constant flip-flop 164 will be triggered from its cleared condition to its set condition so as to produce a zero logic level signal "0" at its K output terminal. This in turn is inverted by a power driver 165 to produce the enabling potential EC at logic "1" level. As described earlier the enabling potential EC together with the appearance of the W3 timing signal operate to enable the circuitry to enter the new constant into the delay line unit.

The preceding description of the operation of the new and improved digitally operable conversion apparatus has assumed the condition that the incoming fringe count pulses are being converted in a scale of one conversion process. As stated previously, due to the finite processing time required to accomplish each conversion on the part of the arithmetic unit, there is an inherent limitation that would be built into the equipment if only scale of one conversion were possible. To overcome this limitation, additional circuitry has been provided to allow the conversion apparatus to selectively operate in either a scale of 1, a scale of 10 or a scale of 100 operating mode.

Scale of 10 and Scale of 100 Circuitry

Integrate Command Circuit

FIG. 6 of the drawings, as stated earlier in the description, illustrates a network of interconnected preliminary, intermediate and delay storage flip-flops numbered 111 through 118 and three serially connected sign indicating flip-flops 119 through 122. Each set of serially connected flip-flops is labeled with the scaling factor with which data to be entered into the arithmetic unit as a consequence of these flip-flops, is to be converted. For example, the serially connected flip-flops 111 and 112 are labeled PINT 1 and INT 1 and operate to develop the integate by one command signal INT 1. Similarly, the serially connected flip-flops 113 through 115 are labeled PINT 10, INT 10 and DINT 10 and function to develop the two command signals INT 10 and DINT 10. The flip-flops 116 through 118 are similarly related to develop the command signals INT 100 and DINT 100, as is also the sign indicating flip-flops 119 through 122 which develop the command signals SUB and DSUB. Each of the respective command signals is developed initially in the preliminary storage flip-flop 119, 111, 113 and 116 in response to a permissive steering signal supplied to the set steering input thereof from the output of a plurality of three input OR gates 201, 202, 203 and 204, respectively. The three input OR gate 201 has its output connected to the PSUB flip-flop 119 and has supplied thereto a sign indicating signal $\overline{\text{SPS}}$ from each of the X axis, the Y axis and the Z axis count recognition and correction circuitry that comprises a part of the X, Y and Z axis interferometer and buffer storage input circuit arrangement 10*a* as indicated in FIG. 1 of the drawings. In a similar manner, the three input OR gate 202 has supplied thereto an input signal $\overline{\text{CORR 1}}$ derived from the count recognition and correction circuit 17 of each of the X, Y and Z axes, the three input AND gate 203 has the input signal $\overline{\text{CORR 10}}$ from each of the X, Y and Z axes, and the AND gate 204 receives the $\overline{\text{CORR 100}}$ in a similar manner.

Each of the signals $\overline{\text{SPS}}$, $\overline{\text{CORR 1}}$, $\overline{\text{CORR 10}}$, and $\overline{\text{CORR 100}}$ is developed in the count recognition and correction circuitry 17 of each of the respective X, Y and Z axis input circuits from the count accumulated in the reversible counter 16 associated with the particular axis input circuit. These count updating signals are supplied to the integrate command circuit preliminary storage flip-flops upon demand at a particular point in one circulation of the digital integrator. The manner in which this selection is made is described more fully in copending application Ser. No. 709,368 of H. E. Vigour. Briefly, however, the selection is determined by the application to the count recognition and correction circuitry 17 of a RECOUNT signal developed by the arithmetic unit and generally extending over one function time that is for a period of 100 bits. For the processing of fringe count conversion relative to the X axis, the RECOUNT timing signal will in fact comprise the F3 timing signal shown in FIG. 3(B) of the drawings since it is during this time that it will be desirable to initiate the start of the conversion process. Similarly, the Y and Z axes are initiated with the F1 and F2 timing signals respectively. A second permissive signal required to read in new input fringe counts stored in the reversible counters is a signal labeled PCR (permit count recognition) signal.

This PCR signal is developed by the PINT 1, PINT 10, and PINT 100 flip-flops 111, 113 and 116 whose reset output terminals are connected directly to three of the inputs of a four input AND gate 205. AND gate 205 has its fourth input connected to a $\overline{\text{OO}}$ timing signal which corresponds to the end of a function timing signal such as the last bit (B4) of the space signal (SP) shown in FIG. 3(A) of the drawings. AND gate 205 has its output connected back through an inverter power driver circuit 206 to supply the PCR permissive signal (which is required to read in any new data into the PINT 1, PINT 10, and PINT 100 flip-flops) back to the Count Recognition and Correction Circuit 17. It will be appreciated therefore that as long as the flip-flops 111, 113 and 116 are in their cleared state, AND gate 205 will be enabled to supply a PCR signal back to the count recognition circuitry 17. However, upon any one of the preliminary flip-flops 111, 113 or 116 being set by an input fringe count to be added to the data circulating in the delay line, the AND gate 205 will be prevented from any further recognition of the counter state, and further modification of its stored count on succeeding clock pulses is prevented due to the PCR enabling signal going to "0".

Concurrently with the above described action, the same timing signal, $\overline{\text{OO}}$ is passed through a power driver inverter 207 and is applied to both the set and reset input terminals of all of the intermediate flip-flops 121, 112, 114 and 117 so as to cause the information stored in the preliminary flip-flops 119, 111, 113 and 116 to be shifted down into the intermediate flip-flops where it is considered active information and can actually control the operation of the arithmetic unit. Concurrently this same timing signal $\overline{\text{OO}}$ also clears all of the preliminary flip-flops and blocks the recognition gates 205 so that no new count recognition can take place during the particular clock period in which clearing of the preliminary flip-flops occurs. During the next successive 100 clock bit times during which the arithmetic unit will be involved in reading the new data into the delay line at its appropriate point in the delay line format, the preliminary flip-flops 119, 111, 113 and 116 are available for storing information from the buffer storage reversible counter 16 associated with another different motion axis such as the Y or Z axis. Hence, during the following 100 bit times the preliminary flip-flops may again be set to read in new data from the Y axis, for example. At the end of this next 100 bit times, the $\overline{OO}$ signal will serve to shift the information in the intermediate flip-flops 121, 114 and 117 down into the delayed flip-flops 122, 115 and 118, respectively, and concurrently will shift the information stored in the preliminary flip-flops 119, 111, 113 and 116 down into the intermediate working flip-flops 121, 112, 114 and 117. The timing relation of the output timing signals produced by these flip-flops is depicted in the timing chart shown in FIG. 3(A) of the drawings. From a consideration of these charts, it will be appreciated that for an X axis conversion process during function 3 time (F3) the PSUB, PINT 1, PINT 10 and PINT 100 signals are produced, during function 1 (F1) time the SUB, INT 1, INT 10 and INT 100 signals are produced; and during function 2 (F2) time, the DSUB, DINT 10 and DINT 100 signals are produced. There is no need for a DINT 1 signal since there is no computation at the next function time associated with the processing of the integrate by scale of one data values. The above signals are shifted in function times for processing the other axes.

From a consideration of the above description, it will be appreciated that an INT 1 enabling potential serves to indicate to the arithmetic unit that data being supplied to the unit is to be processed at a scale of one, the INT 10 and DINT 10 enabling potential indicate that the data is to be processed at a scale of 10, and the INT 100 and DINT 100 indicate that the data is to be processed at the scale of 100. By this is meant each signal pulse appearing at the output of the INT 10 and DINT 10 represent 10 input fringe count pulses, and the data appearing at the INT 100 and DINT 100 outputs represents 100 fringe count pulses. The SUB and DSUB signals are supplied to the N1 input terminal of the arithmetic unit to instruct it to process any particular incoming set of data bits by subtracting it from the PRI input. Absence of a signal at the SUB or DSUB terminals indicates to the arithmetic unit that the data is to be added. The manner in which the INT 10, DINT 10, INT 100 and DINT 100 signals are employed to effect a scale of 10 or a scale of 100 conversion will best be appreciated in connection with FIG. 4 of the drawings. Prior to describing FIG. 4; however, it is believed best to first describe in numerical terms the operation that the circuitry shown in FIG. 4 actually performs.

Delay Shift Register Operation

The simple overflow from the minor sum remainder register to the major sum remainder register occurs in the conversion of one or more units of fringe count per conversion cycle. In the conversion of 10 or 100 units of fringe count in one conversion cycle of the arithmetic unit, the number in the conversion constant register is increased in magnitude by 10 or 100 times for entry into the arithmetic unit. This is achieved by the method of moving each digit in this constant to a time of greater significance in the serial computation. To implement this increase in significance in the 10 and 100 unit conversion process, the one and two most significant digits of the conversion factor are added respectively to the first one and first two of the least significant digits of the major sum register. This shifting and selection of the digital decimal values is best depicted in FIG. 5 of the drawings wherein by following through the shifting and selection of word two in digits 7 and 8 (W2D7 and W2D8) (the value of the conversion constant is stored in word two) it will be seen that this value is indeed increased in decimal significance by a factor of 10 and 100, respectively.

Delay Shift Registers

It will be appreciated from the foregoing description that the circuitry shown in FIG. 4 constitutes a scaling means for selectively entering the conversion factor into the remainder registers either on a one for one basis wherein one conversion factor is entered for each input signal pulse, or the value of the conversion factor is entered at a more significant position in the remainder register during one cycle of operation of the arithmetic processing circuit means to thereby process multiple numbers of input signal pulses in a single operating cycle and improve the processing speeds of the conversion apparatus. This scaling circuitry is comprised by a conventional four stage shift register SR1 formed by four flip-flops 211, 212, 213 and 214 interconnected in a 1,2,4,8 code to provide an additional seven bits of delay in the data circulated through the shift register at its output marked SR out. The interconnection of the shift register SR includes a feedback two input AND gate 215 having one of its inputs connected to the L output terminal of flip-flop 211 and having its second input supplied with the timing signal $\overline{W3D}$. This connection allows data being circulated through the four bit shift register comprised by SR1 to be recirculated back from the output to the input thereof at $\overline{W3D}$ time. Recirculation through the shift register the desired or required number of times is assured by reason of the inclusion of a second two input AND gate 215 having its output terminal connected directly to one of the reset steering gates of flip-flop 212, and connected through an OR gate 217 to the set steering input of flip-flop 212. AND gate 216 has one of its inputs connected to the ARO output of the arithmetic unit 20 and has its other input terminal connected to the timing signal W3D. It will be appreciated that word 2, the word in which the conversion factor is stored, is delayed four bit times in the arithmetic unit 20, so that as it emerges at the output of the arithmetic unit as signal ARO, this occurs during word 3 time. It is necessary to use the W3D timing signal however due to the fact that at this point in the circuitry, the signals at the inputs and output of the arithmetic unit are timed one bit time after the main timing signals and coincident with the delayed timing signals such as W1D From an examination of FIG. 4, it will be appreciated that during word 1 and word 2 time, the AND gate 216 will not be enabled, so that the word 2 can be freely circulated in the four bit shift register 211 through 214 during these two word times without disturbance.

The above described recirculation of word 2 into and out of the shift register SR1 is best depicted in FIG. 5 of the drawings wherein the shifting and selection of word 2 through the SR1 shift register is diagramed. Considering word 2 at digit 7 time W2D7, it will be seen that this word is shifted four bits in passing through the arithmetic unit to word 3 digit 7 time (W3,D7). During word 3 time, this digit (7) of the conversion constant is entered into shift register SR1 at which time digit 6 of the conversion constant is being shifted out of SR1 into SR2 through logic gates 228, 226 and 227. Following this, during the next two succeeding word time intervals, digit 7 is recirculated through the SR1 shift register twice to thereby accumulate a total of 12 bits of delay. At this point, it will be seen that the data contained in digit 7 of word 2 which originally was the next most significant decimal digit of the conversion constant is now in time correspondence with the most significant digit of the minor sum register. This means shifts digit 1 through 7 to time correspondence with the next more significant digits 2 through 8 to effect a 10 time increase in their magnitude. In a similar manner, the most significant digit 8 of the conversion constant is shifted to time correspondence with digit 1 of word 1 of the corresponding major sum remainder register thereby also multiplying this digit by a factor of 10. Accordingly, at this point, it is possible by adding word 2 to word 3 to in effect increase the significance of the conversion constant stored in word 2 by a factor of 10. This is effectively the same thing as moving the decimal point one place thereby processing 10 units of fringe count in one conversion operation.

The scaling circuitry for accomplishing the scale of 100 integration is comprised by a four bit shift register SR2 consisting of four serially connected J-K flip-flops 221, 222, 223, and 224. The output from the scale of 10 shift register SR1 is supplied to the input of the scale of 100 shift register SR2 through a two input AND gate 225 and a two input OR gate 226. The output from the OR gate 226 is supplied directly to the set input terminal of J-K flip-flop 221 and is applied through an inverter 227 to the reset steering input terminal. The remaining input terminal of AND gate 225 has the word 3 timing signal W3 supplied thereto so that at word 3 time, the output data being circulated by the scale of 10 shift register SR1 may be read into the scale of 100 shift register SR2. Thereafter, the SR2 register operates in the manner of a conventional four bit serially readout shift register to provide four bits of delay between the input flip-flop 221 and the output flip-flop 224. The output from flip-flop 224 is supplied back to the input of shift register SR2 through a two input AND gate 228 having its output connected to one of the terminal of OR gate 226. The remaining input terminal of AND gate 228 is connected to the $\overline{W3}$ timing signal so as to facilitate recirculation of the bits of a word being circulated through SR2 back into the input of SR2 to accomplish the recirculation necessary to obtain the desired delay. From an examination of the word shifting and selection chart shown in FIG. 5 of the drawings, it will be seen that during the scale of 100 operation, that word 2 of digit 8 (W2,D8) will be in fact recirculated a number of times to provide 24 bits of delay so as to cause it to appear at the output of the shift register SR2 coincident with the occurrence of word 1 in digit 2 time W1D2. Word 2 of digit 7 (W2D7) is recirculated through both the SR1 and SR2 shift registers in an identical manner so that it appears at the output of the SR2 shift register concurrently with word 1 of digit 1 time (W1D1). Digits 1 to 6 of word 2 are delayed by the action of shift registers SR1 and SR2 a total of 24 bit times to effect an increase of 100 times in magnitude for use with the scale of 100 conversions.

From the above description, it will be appreciated that in the conversion of 10 or 100 units of fringe count in one conversion cycle of the arithmetic processing circuit means, the number in the conversion constant register is increased in magnitude by 10 or 100 times for entry into the arithmetic unit. This is accomplished by the method of moving each digit of the conversion constant to a time of greater significance in the serial computation. Thus in the 10 and 100 scale conversion process, the 1 and 2 most significant digits of the conversion constant are added respectively to the first one and first two of the least significant digits of the major sum register. This shifting and selection of the digits of the conversion constant is shown in the diagram illustrated in FIG. 5.

During a scale of 10 conversion operation, the data appearing at the SR1 shift register output is supplied to one of the input terminals of a four input AND gate 231, and to one of the input terminals of a second four input AND gate 232. The four input AND gate 231 has its remaining input terminals connected respectively to the timing signal INT 10, W3 and D1. The four input AND gate 231 has its remaining input terminals connected respectively to the timing signal INT 10, W3 and $\overline{D1}$. The four input AND gate 232 has its remaining input terminals connected to the timing signals DINT 10, W1 and D1. The outputs from each of the AND gates 231 and 232 are supplied to respective input terminals of a four input OR gate 233 having its output labeled ITH. As is shown in FIG. 2 of the drawings, the ITH output signal from OR gate 233 is applied directly to the set input steering terminal of a secondary data resync flip-flop 234 and is supplied through an inverter 235 to the reset input steering terminal of flip-flop 234. The output from the data resync flip-flop 234 is supplied through one of the input terminals of the two input OR gate 103 to the SEC input of the arithmetic unit 20.

By reason of the above circuit connections, during the integrate by a scale of 10 operations of the conversion apparatus, the SR1 output will be supplied respectively through the AND gate 231 at word 3 time of digits 2 through 8 so as to supply the values of word 2 to the arithmetic unit for addition to the minor sum register appearing in word 3 thereby increasing the number stored in the minor sum register by ten times the magnitude of the value of the seven least significant digits of the conversion constant. During word 1 time of digit 1 time of the next succeeding function (DINT 10, W1, D1) the value of word 2 digit 8 will be supplied through the AND gate 232 to be added to the least significant decimal digit stored in word 1 of the major sum remainder register.

In a somewhat similar manner, the output of the SR2 shift register is supplied through a five input AND gate 236 to OR gate 233 or through a four input AND gate 237 to output OR gate 233. The output from shift register SR2 is supplied through AND gate 236 during digits 2 through 8 of word 3 time (INT 100, W3, $\overline{D1}$, $\overline{D2}$). It will be noted that in the INT 100 mode of operation, there is no data supplied during the digit 1 and 2 times of word 3, so that essentially a zero value signal will be supplied as the ITH signal to the arithmetic unit. During word 1 time and at both digit 1 and digit 2 time (due to the $\overline{D1}$ and $\overline{D2}$ enabling signals supplied to an OR gate 238) the values of word 2 digit 7 and word 2 digit 8 will be supplied respectively to the arithmetic unit during digit 1 time word 1 time D1W1 and digit 2 word 1 time D2W1, respectively. Thus, it is seen that during the 10 and 100 unit conversion process, the 1 and 2 most significant digits of the conversion constant are added respectively to the first one and first two of the least significant digits of the major sum register.

Feedback Timing Interval Control Circuit

Feedback Timing Interval Signal Generator

The feedback timing interval control circuit 26 generates the necessary feedback timing interval commands that must be supplied to the X, Y and Z axis feedback variable phase counters of the machine tool control shown in FIG. 1. The feedback timing interval control 26 must be designed in such a manner that it can accommodate the variably scaled feedback signal to be applied to the feedback variable phase counters. The graph labeled percent feedback interval shown at the bottom of FIG. 3(*b*) of the drawings illustrates generally the purpose and functioning of the feedback interval control. For a more detailed description of the manner in which the gating signals developed by the feedback interval generator are employed to control the movement or positioning of the machine tool working head, reference is made to the above-identified C. J. Isak application Ser. No. 709,405. Briefly stated, however, these timing signals are applied to the feedback variable phase counter where they are employed to develop a square wave, phase shifted analog output signal that is compared to a command, square wave shaped analog signal in a wide range discriminator that detects any phase difference and produces an output error signal which is proportional to any such phase difference. This output error signal is employed in driving the servomotor in a direction and at a speed designed to reduce the difference output signal to zero value. In order to produce a properly phase shifted feedback analog output signal at the output terminal of the feedback variable phase counter, proper generation of the feedback interval timing signals supplied to control the feedback variable phase counter, is required in order that the analog feedback signal accurately reproduce the distance measurement count accumulated in the minor sum and major sum remainder registers.

The design of the overall feedback arrangement is such that each increment of phase shift corresponds to a known amount of movement in the position of the working head of the machine tool. Depending upon the resolution desired, one increment of phase shift can be made to equal some known number of increments of measure as converted from the input fringe count pulses. In the embodiment of the invention being described, one increment of phase shift was made to be equal to one increment of overflow from the most significant digit of the minor sum remainder register (i.e., any overflow carry or borrow value from the minor sum to the major sum remainder register). For this reason, it is the RDC output from the arithmetic unit 20 (which represents the overflow carry values out of the most significant decimal digit of the minor sum remainder register into the least significant digit of the major sum remainder register) that is supplied to the feedback interval timing control circuit. In addition, the values of digit 8 and/or digit 7 are supplied to the feedback interval timing control 26 during an integrate by a scale of 10 or integrate by a scale of 100 operation as will be described more fully hereinafter. It should be noted at this point, however, that if some coarser resolution would be adequate for a particular machining operation being carried out, it is quite possible to adapt the equipment shown to such coarser machining operation by utilizing, for example, the output decimal carry overflow values into digit 2 of the major sum remainder register from digit 1 of that register so that in effect instead of one increment of phase shift thus derived representing a given number of input fringe count pulses, it would then represent 10 times the given number of input fringe count pulses. If a finer resolution were desired, the equipment similarly could be modified in the opposite direction to pick up the output signals of lesser decimal digit values so that one increment of phase shift would then represent a lesser number of input fringe count pulses. Modification of the equipment to accommodate a particular resolution desired in the above described manner is believed to be entirely within the skill of one versed in the art and need not be described in detail in the light of the following description wherein the resolution is such that one incremental output from the most significant decimal digit of the minor sum remainder register is equal to one increment of phase shift of the gating signal derived by the feedback interval timing circuit 26. This feedback timing interval gating signal will then determine the amount of phase shift produced in the feedback analog phase shifted output signal derived by the feedback variable phase counter 27.

The percent feedback interval diagram shown at the bottom of FIG. 3(B) of the drawings illustrated schematically the composition of the feedback interval timing signal. The manner in which the various percent timing intervals actually are derived and shaped, is indicated by the gear range multiplier curves noted as GRM1 through GRM4 appearing just above this diagram. In the present equipment, one increment of phase shift was assigned to be a value equal to 0.1 percent of a full cycle of phase shift. Since there are 360° of phase shift possible, one increment then would represent 0.36° of phase shift. In the embodiment described and illustrated herein, the magnitude in units of phase shift for each conversion operation is directly dependent upon the number of units of change in the major sum remainder register. For scale of 1 conversion, this magnitude is equal to the overflow (1 unit) from the minor sum remainder register to the major sum remainder register. For scale of 10 conversion, this magnitude is equal to the sum of the above overflow and the number of units of the most significant digit of the conversion constant. For the scale of 10 conversion, this magnitude is equal to the sum of the above overflow, the number of units of the second most significant digit of the conversion factor, and 10 times the number of units in the most significant digit of the conversion factor. The means of converting these magnitudes into a specific number of two clock time long intervals is by means of a group of gear ratio timing signals GRM1, GRM2, GRM3 and GRM4 which span 20, 40, 60 and 80 percent respectively of each 10 clock time long interval combined with another group of percent feedback interval zones. In the course of 100 clock times during which the phase shift associated with a conversion operation on each axis is to be completed, the GRM signal patterns repeat 10 times and the percent feedback interval signals repeat once. The apparatus shown in FIG. 8 is capable of time sharing operation to sequentially control the shift of the phase of three axes of feedback signals in accordance with the magnitude of fringe count converted on each axis. Each two clock time long interval of the output signal will generate one unit of phase shift.

The combination of the overflow signal from the minor sum register, the C/B percent feedback interval zone and the GRM signal produces one unit of phase shift time interval occuring in the last two clock intervals of each function time. The 10, 20, 40 and 80 percent feedback interval zones are selected respectively by the BCD code of the number added to the least significant digit of the major sum remainder register. Since this number is in the range of 0 to 9, a zone of 0 to 90 percent of a function time is selected. The combination of the present feedback interval and the GRM1 timing signal effectively selects 0 to 9 units of phase shift timing intervals. The number of the digit added to the second least significant digit of the major sum remainder register selects a combination of GRM signals which are repeated 10 times during a 100 bit function time to produce ten times as many units of phase shift timing intervals as the magnitude of the digit. The number in the most significant digit of the conversion constant must be limited to the range of 0 to 4 for the proper performance of this phase shift control conversion. Thus a conversion constant of 31142697 will produce in the scale of 100 conversion 32 units of phase shift timing intervals if there is a carry out of the minor sum remainder register. If there was no carry only 31 units would have been produced. The arrangement of these timing intervals is such that the intervals due to each factor can be added together because no real combination of numbers produces coincident timing intervals.

While the output timing intervals are nominally expected to be used to control the phase shift of a feedback phase counter, they could have been fed to a reversible counter which counts both the number of these intervals as well as command intervals prescribing the required servo motion. In this case, the number stored in this reversible counter and its polarity represent a magnitude to be converted into a DC servo signal to the servo drive system of a machine tool.

An example of the manner in which the GRM1 through GRM4 gear range multiplier gating signals can be combined with the carry/borrow (C/B) gating signal to provide a desired composite feedback interval timing signal having the desired number of phase shift increments, is illustrated in the last four curves of FIG. 3(B) of the drawings. Assuming that the circuit is operating in the scale of 100 conversion mode, and that it is desired to provide a feedback interval timing signal having 32 increments of phase shift, then the GRM2 and the GRM3 signal would be employed to provide 30 increments of phase shift, the GRM1 and 10 percent feedback interval signals would be added to provide one additional increment of phase shift and the GRM1 and carry/borrow feedback interval signal C/B would be added to make up the composite total of 32 increments of phase shift called for in a somewhat symmetrically shaped feedback interval timing signal. It should be noted in connection with the timing diagram shown in FIG. 3(B) that in the particular embodiment of the equipment disclosed, and utilizing the gear range multiplying signals GRM1–GRM4 indicated, it is possible during a scale of 100 conversion only to provide feedback interval timing signals having only 10, 20, 30 and 40 plus one through nine increments of phase shift, and that 50 or greater increments of phase shift are not allowed. This is due to the particular design of the feedback interval timing control circuit employed in the specific equipment being described. However, in keeping with the spirit of the invention, it is believed obvious that suitable feedback interval timing circuitry readily can be developed to provide increments of phase shift in 10 percent steps from 1 to 100 in the manner herein described, and would be entirely within the skill of one versed in the art.

Scale of 1 Feedback Interval Control

FIG. 8 of the drawings illustrates the construction of the feedback interval timing control circuit. In the lower left corner of FIG. 8, the RDC signal supplied from the output of the arithmetic unit (which represents at this time the overflow carry/borrow value from the most significant bit in the minor sum remainder register), is supplied as an enabling potential to one of the set input terminals of a store carry flip-flop 251. In addition to this signal, enabling potentials are applied to the remaining two set input steering terminals at digit 1 time D1 and at word 2 delayed time W2D. Accordingly, if there is an overflow carry/borrow value from the most significant digit of the minor sum remainder register to be carried over into the least significant decimal digit of the major sum remainder register, this signal in conjunction with the D1 and W2D signals will set the store carry flip-flop 251.

Upon being set, flip-flop 251 supplies an enabling potential to one of the input terminals of a two input AND gate 252. AND gate 252 has its remaining input terminal connected to the output of a power driver 253 that in turn has its input connected to the output of a three input AND gate 254. The three input AND gate 254 has the D8, W2 and B2 timing signals supplied to its three input terminals. As a result of this connection, during digit 8 at bit two time of word 2 (D8,B2,W2) an enabling potential will be applied to the AND gate 252 and will result in producing a set for C/B signal that is supplied through a four input OR gate 255 directly to the set steering input terminal, and through an inverter 256 to the reset steering input terminal of an interval control flip-flop 257.

The flip-flop 257 is designed so that a set signal overrides a clear signal and accordingly, upon the next input clock pulse applied to its C1 input terminal, it will assume a set state and apply an enabling potential to a two input AND gate 258. The two input AND gate 258 has the gear range multiplier gating signal GRM1 applied to its remaining input terminal and has its output terminal connected to one of the inputs of a four input OR gate 259. The OR gate 259 has its output terminal connected to one input terminal of each of the two input AND gates 261, 262 and 263. The AND gate 261 has its remaining input terminal connected to the function 2 timing signal F2 so that it will supply the GRM1 gating signal as an output feedback interval timing signal to the feedback variable phase counter for the X axis on all occurrences where AND gates 258 and 261 are simultaneously rendered permissive. AND gate 262 similarly has its remaining input terminal connected to the F3 timing signal, and AND gate 263 has its remaining input terminal connected to the F1 timing signal. It will be appreciated therefore that the GRM1 gating signal will be supplied through whichever one of the X axis, Y axis or Z axis AND gates 261, 262 or 263 is activated during the processing of the data relating to that particular axis as the feedback interval timing signal for the respective axis of interest. The scaling is such at one GRM1 gate pulse (such as shown at 260 in FIG. 3(B)) represents one increment of phase shift.

At the end of each function, a $\overline{OO}$ timing signal is produced at the output of a two input AND gate 264 that is supplied through one of the input terminals of a four input OR gate 265 to the reset or clearing input steering terminal of interval control flip-flop 257. The two input AND gate 264 has supplied to its two inputs the space timing signal SP and the bit 4 timing signal B4. The occurrence of these two timing signals concurrently indicates the end of the function and is employed to clear or reset the interval control flip-flop 257. Resetting or clearing of the interval control flip-flop 257 will then terminate any carry/borrow C/B gating pulse being applied through one of the X axis, Y axis or Z axis AND gates 261, 262 or 263.

Scale of 10 Feedback Interval Timing Signal Generation

When operating in the scale of 10, a four bit shift register comprised by the four flip-flops 271, 272, 273 and 274 shown in FIG. 8 is employed. The four flip-flops 271 through 274 are connected as a conventional 8-4-2-1 serially coded shift register, and have supplied to the set steering input terminals thereof the output signal pulses appearing at the L(set) output terminals of each of the flip-flops 212, 213, 214 respectively of delay shift register SR1. The flip-flop 271 has supplied to its set steering input terminal the output from the OR gate 217 that is connected to the set steering input terminal of flip-flop 212 of the SR1 shift register. As a result of this parallel connection of the set steering input terminals of the flip-flops 271 through 274 to the output terminals of the SR1 shift register, the binary values of the decimal digit stored in the SR shift register will be shifted down into the buffer storage shift register comprised by flip-flops 271 through 274 at a particular point in a circulation cycle.

The point at which this shifting down of the decimal digital value stored in the SR1 shift register for a scale of 10 operation takes place, is determined by a three input AND gate 275 having its three input terminals connected to the INT 10 timing signal, the SP timing signal and the B1 timing signal. The output of three input AND gate 275 is connected through a two input OR gate 276 whose output in turn is connected to a second set of steering input terminals for each of the buffer storage flip-flops 271 through 274. As a consequence of this connection, during an integrate by scale of 10 operation, upon the four bit spacing signal SP appearing at the end of the function, and during bit one B1 of that spacing signal, an enabling potential will be applied from the output of OR gate 276 to the set steering input terminals of each of the buffer storage flip-flops 271 through 274. Prior to this occurrence, during digit 7 time, the D7 timing signal has been applied to the reset steering terminal of all of the storage flip-flops 271 through 274 so that these flip-flops had been set to their cleared condition. Consequently, upon the application of the enabling potential to the set steering input terminals from the output of OR gate 276, the value of digit 8 which at that particular point in the circulation cycle had been circulating in the SR1 delay shift register, will be shifted down and stored into the buffer storage flip-flops 271 through 274.

If the decimal digital value of digit 8 now stored in the storage flip-flops 271 through 274 is such that there is a call for one increment of phase shift, it will be in the form of a logic 1 stored in the flip-flop 274. Hence FF274 will provide an enabling potential to one input terminal of a two input AND gate 277. AND gate 277 has its remaining input terminal connected to the output of an inverter 278 that in turn is connected to the output of the OR gate 264. As a consequence of this connection, AND gate 277 will be enabled during bit 4 of the space time (B4SP) so as to apply a set enabling potential through the OR gate 255 to the interval control flip-flop 257. Upon the interval control flip-flop 257 being thus set, it will provide an enabling potential to the GRM1 input AND gate 258 so that the GRM1 gating signal pulse can be supplied out through OR gate 259 and through the X axis input AND gate 261 to drive the X axis feedback variable phase counter. Subsequently, a 10 percent clear signal is supplied through OR gate 265 to the reset (clear) input steering terminal of FF257 at D1W3B2 time from an AND gate 283. This resets FF257 after only one GRM1 gating pulse (such as shown in FIG. 3(B)) has been supplied to the feedback variable phase counter for the X axis. In a similar manner, the Y and Z axis feedback variable phase counters will be supplied one GRM1 gating pulse 260 which corresponds to one increment of phase shift during the function 3 and function 1 times, respectively.

In the event that the decimal digital value of digit 8 is such that there is a logic 1 stored in its next most significant binary bit, then there will be a zero potential appearing at the reset output terminal of FF273 which is supplied to one of the inputs of a two input OR gate 279. The zero value appearing at the reset output terminal of flip-flop 273 is employed as an indication that two increments of phase shift are called for, so that an enabling potential appears at the output of OR gate 279 that is applied to one input terminal of a two input AND gate 281. AND gate 281 has its remaining input terminal connected to the output of an inverter 282 that in turn is connected to the output of a three input AND gate 283. The three input AND gate 283 has its three inputs connected respectively to the digit 1 word 3 and bit 2 timing signals (D1,W1,B2) so that during digit 1 time upon the occurrence of bit 2 in word 3, AND gate 281 will be enabled so as to apply a set input steering signal to the interval control flip-flop 257. Setting of the interval control flip-flop 257 at this point in a circulation cycle results in applying the GRM1 gating signal through AND gate 258 and OR gate 259 to the X axis input AND gate 261 during digit 2 and 3 times of function 2. During digit 3 time of function 2 (D3F2), a reset or clearing signal will be supplied through the OR gate 265 to the reset steering terminal of interval control flip-flop 257 from the output of a four input AND gate 284.

AND gate 284 has one of its four inputs connected respectively to the reset output terminal of the most significant digit flip-flop 271 in the storage shift register, the D3, word 2 and bit 2 timing signals. If the value of decimal digit 8 is such that there is a logic zero stored in the flip-flop 271 and a logic "1" stored in FF273, then a 20 percent feedback signal is called for and a clear or reset signal will be produced at the output of four input AND gate 284 during D3W2B2 time. This reset signal is supplied through OR gate 265 to the reset input terminal of interval control flip-flop 257 to cause it to be reset so as to remove the enabling potential formally being supplied to the two input AND gate 258. Upon removal of this enabling potential, the GRM1 gating signal pulses will be prohibited and will have resulted in the supplying of a feedback interval timing signal through AND gate 261 of a nature such that 20 percent or F increments of phase shift have been called for. It will also be appreciated that if both the AND gate 277 and the AND gate 281 have been previously enabled due to the fact that there is a logic 1 stored in both of the flip-flops 273 and 274, then at the time that the clear 20 percent signal supplied from the output of AND gate 284 resets interval control flip-flop 257, 30 percent or three increments of phase shift feedback interval timing signals will have been supplied through the two input AND gate 261 to the feedback variable phase counter.

In the event that the decimal digital value stored in the buffer storage register is such that there is a logic "1" stored in flip-flop 272, then a set 40 percent of the time enabling potential will be supplied from the output of a four input AND gate 285 which has its four inputs connected respectively to the set output terminal of flip-flop 272, and to the digit 5 word 1 and bit 2 timing signals (DS,W1B2). Accordingly, if flip-flop 272 is in the set condition, during digit 5 and a bit 2 of word 1 time, a set 40 percent enabling potential will be supplied through the OR gate 255 to the set steering input terminal of interval control flip-flop 257 This will result in the application of the GRM1 gating signal pulse to the X axis feedback variable phase counter input for an interval of time extending over the 40 percent feedback interval shown in the percent feedback interval curve of FIG. 3(B). This will correspond to four increments of phase shift. The FF257 is reset by a reset or clear 40 percent signal supplied from the output of the three input AND gate 254 at digit 8 word 2 bit 2 time (D8,W2,B2). This signal is supplied back through the B2 input of OR gate 265 directly to the reset steering input terminal of interval control flip-flop 257. At this same point in the circulation cycle, if there has been an overflow carry/borrow value to be supplied from the minor sum o the major sum remainder register, this carry/borrow value will be supplied through the output of the two input AND gate 252 to also maintain the interval control flip-flop 257 set during the 10 percent carry/borrow interval, which in the scale of 10 operating mode, corresponds to one increment of phase shift.

In the event that the decimal value of the digit stored in the buffer storage 271 through 274 is such that the most significant flip-flop 271 is in a set condition (corresponding to a value of logic "1"), there will be a logic "0" signal appearing at the reset not output terminal of this flip-flop. It will be appreciated therefore that under such conditions, the AND gate 284 will not have been enabled so that it will not have produced the clear 20 percent reset signal at digit 3 word 2 bit 2 time (D3,W2,B2). The appearance of a logic "0" at the reset K output terminal of flip-flop 271 will be inverted by OR gate 279 and supplied as an enabling potential to the two input AND gate 281. Thus, during digit 1 at word 3 bit 2 time (D1,W3,B2) a set input enabling potential will have been supplied from the output of AND gate 281 and through OR gate 255 to the interval control flip-flop 257. This will have resulted in turning on the interval control flip-flop 257 at a point in the operating cycle corresponding to the start of the 20 percent turnon gating signal, but extending all the way through the circulation cycle corresponding to the start of the carry/borrow (C/B) interval at which point it is turned off by the clear 40 percent or 80 percent reset signal supplied from the output of the three input AND gate 254. This would correspond to the supply of eight increments of phase shift in one circulation cycle to the X axis feedback variable phase counter. This 80 percent feedback interval timing signal will be in the form of eight GRM1 gating pulses supplied during function 2 time to the feedback variable phase counter for the X axis. At the end of the eight GRM pulses, if there is a carry/borrow value overflow from the minor sum to the major sum remainder registers, this value too will be supplied by maintaining the interval control flip-flop 257 in its set state during the C/B interval. Because of the particular turnon and turnoff times provided, it will be appreciated that during the scale of 10 operating mode, either 1,2,3, etc. through a total of 10 GRM gating on pulses can selectively be supplied to the X axis feedback variable phase counter to selectively provide from one to 10 phase shift increments of feedback and corresponds to multiplying by ten the significance of the fringe count pulses being processed.

Scale of 100 Feedback Interval Timing Signal Generation

During the scale of 100 operating mode, the 1, 2 and 4 bits of digit 8 of a function being processed are stored in a set of three buffer storage flip-flops 291, 292 and 293 which comprise a digit 8 buffer storage shift register. The flip-flop 291 has its set and reset steering input terminals connected respectively to the set and reset output terminals of the SR1 flip-flop 211, flip-flop 292 has its set and reset input steering terminals connected respectively to the set and reset output terminals of the flip-flop 212, and flip-flop 293 has its set and reset steering input terminals connected respectively to the set and reset output terminals of the flip-flop 213 in delay shift register SR1. In addition, each of the flip-flops 291 through 293 have second input set and reset steering terminals connected to the output of the inverter 278 which in turn is connected to the output of the two input AND gate 264. Two input AND gate 264 has the space SP and bit B4 timing signal supplied to the input thereof so that during bit 4 of the timing space SP, a OO enabling potential is applied to the steering inputs of each of the flip-flops 291 through 293. Upon this occurrence at the next clock pulse interval, the values stored in the flip-flops 211, 212 and 213 of delay shift register SR1 will be read into storage flip-flops 291, 292 and 293. It might be noted at this point, that in the particular circuit shown in FIG. 8, there is one bit of digit 8 which still remains in the delay shift register SR1 at bit B4 time of the space timing signal SP. When the most significant digit of the conversion constant is limited to no more than four, this remaining digit is always a zero. At this point in time, however, the 1, 2 and 4 values of the decimal digit 8 will be stored in the buffer storage flip-flops 291 through 293.

If it is assumed that the value stored in the flip-flop 293 is a logic 1, then an enabling potential will be supplied from its set output terminal to one input of a four input AND gate 294. Four input AND gate 294 has three other inputs one of which is connected directly to the DINT 100 timing signal, another is supplied with the gear rate multiplier gating signal GRM3 through an inverter 295, and the gear rate multiplier gating signal GRM2 is supplied to the remaining input terminal through an inverter 296. From a consideration of the GRM2 and GRM3 timing signals shown in FIG. 3(B) of the drawings, it will be seen that there are 10 discrete intervals of time when both the GRM2 and the GRM3 signals are at the zero level so that through inversion by the power driver inverters 295 and 296 they will appear as enabling potentials at the two inputs of AND gate 294. Accordingly, during these 10 intervals, 10 gating signal pulses corresponding in length to the GRM1 gating pulses will be applied through the OR gate 259 to the X, Y or Z axis AND gates 261, 262 or 263 depending upon which function is being processed at the time.

If it is assumed that the decimal digit value is such that the flip-flop 292 is in its set or logic 1 condition, an enabling potential from its set output terminal will be supplied directly to one input of a three input AND gate 297. Three input AND gate 297 has one of its remaining input terminals connected to the DINT 100 timing signal and its remaining input terminal connected directly to the GRM2 timing signal. As a consequence of these connections, the GRM2 timing signal can be supplied directly through AND gate 297, and OR gate 259 to the respective X, Y and Z axis AND gate 261, 262 and 263 for distribution to the respective feedback variable phase counters for the X, Y and Z axes. In a similar manner, if the decimal digit 8 value is such that the binary bit stored in flip-flop 291 is at a logic 1 level, then the flip-flop 291 set output terminal enables a three input AND gate 298. AND gate 298 has supplied to the remaining two input terminals thereof the DINT 100 enabling potential and the GRM4 gating signals. Accordingly, it will be appreciated that under these conditions the GRM4 gating signal will be supplied directly through the three input AND gate 298 and OR gate 259 to the respective input terminals of the AND gates 261, 262 and 263 for selective supply to the feedback variable phase counters for the X, Y and Z axes, respectively.

With the circuitry shown in FIG. 9, it is possible to supply incremental gating units having value of 10, 20 or 40 increments due to the fact that the particular application for which the circuit was designed (when employed in the scale of 100 operating mode), required incremental phase shift values only within this range. 50 or greater increments of phase shift are not allowed by the circuit arrangement of FIG. 9 in the scale of 100 operating mode.

In the scale of 100 operating mode, prior to the above described action taking place, at digit 8 time, the decimal digit value of digit 7 is read into the buffer storage register comprised by the flip-flops 271 through 274 through the medium of steering enabling potentials applied through a three input AND gate 299 and OR gate 276. These steering enabling potentials are applied to one of the set steering input terminals of each of the flip-flops 271 through 274. Thereafter, the digit 7 timing signal is applied to the respective reset steering input terminals of each of the flip-flops 271 through 274 so that at the next clock pulse, all of these flip-flops will be set to store the value of digit 7 which at that particular point in a circulation cycle is being circulated in the delay shift register SR1. For this purpose, the input AND gate 299 has supplied to one of its input terminals the INT 100 timing signal as an enabling potential, together with the digit 8 timing signal and the bit 1 timing signal of digit 8 (D8,B1).

The operation of the circuitry shown in FIG. 9 during the scale of 100 operating mode with regard to the digit 7 value stored in the buffer storage shift register comprised by flip-flops 271 through 274, is identical to the operation of that circuitry for a scale of 10 operating mode, and hence will not be described again in detail. It will be appreciated however, that this circuitry can operate through the medium of the GRM1 signal and the interval control flip-flop 257 to supply through AND gate 258 an additional input GRM1 gating signal pulses from one to nine which when added to the 10 gating signal supplied from gate 294 can add up to 19 increments of phase shift called for in the feedback interval timing signal being supplied to the feedback variable phase counter. When added to the 20 increment signal derived from AND gate 297, these additional one to nine GRM1 pulses can produce up to 29 increments of phase shift, and when added to the 40 incremental signal derived from AND gate 298, can supply up to 49 increments of phase shift. Also, if there is a carry/borrow value appearing in the RDC input signal, this carry/borrow value, will appear as one additional increment of phase shift called for in the feedback variable phase counter.

In the event that the decimal value of the digit 8 is such that both the flip-flops 292 and 293 are in their set condition, both 10 and 20 increment (GRM2–GRM1) and GRM2 gating signal pulses will be supplied to the OR gate 259, and hence to the respective X, Y and Z axis feedback variable phase shifters. This is due to the manner of combination of the GRM2 and GRM3 timing signal in the AND gate 294. It will be noted that there are inverters 295 and 296 connected to the inputs of this AND gate 294 which in effect invert the timing signals GRM1 and GRM2 for application to this gate.

As a consequence of this inversion, the 10 incremental unit gating signal resulting at the output of the AND gate 294 will just exactly fit into the GRM2 signal appearing at the output of AND gate 297. Hence the outputs from AND gates 294 and 297 can be summed in OR gate 259 to provide 30 incremental units of phase shift in timing signal supplied to the feedback variable phase counters. If then the value of digit 7 calls for the addition of one more increment of phase shift and there is also a carry/borrow value so that an additional increment of phase shift must be added, the signals will be combined at the input of the OR gate 259 in the manner shown in the composite (32) curve of FIG. 3(B).

From the foregoing description, it will be appreciated that the invention provides new and improved feedback interval control circuit for use with the novel variably scaled conversion apparatus of the invention in a closed loop feedback phase analog control system for automatically and precisely controlling the position of the machine tool head. This feedback interval control circuit is particularly adapted for use with the conversion apparatus of the invention since it is capable of selectively operating in a scale of 1, scale of 10 or scale of 100 operating mode for developing feedback interval timing signals that can be supplied to the feedback variable phase counter employed in closed loop phase analog position feedback type systems.

COMPLEMENTING READOUT CIRCUIT

Under normal operating conditions for the machine tool control shown in FIG. 1, it is desirable for an operator to be able to read the numbers stored in the major sum remainder register for an indication of the exact machine position from time to time. This is accomplished upon demand by reading the number stored in the major sum remainder register into the readout shift register 24 which then can be used to operate digital readout devices such as indicating lamps, projection masks, etc., to indicate the exact machine position at the demand of an operator. Readout of positive numbers poses no problem for these may be supplied directly to the readout shift register from the major sum remainder register which appears as the ARO output of the arithmetic unit during W2 time. However, for practical reasons, it is necessary for a machine tool to be positionable to the positive and negative side of a zero reference position thereby creating the condition in which the number stored in the major sum remainder register is in its true dimensional value with respect to the reference point for up scale or positive positions, but the number is in a complemented form for negative or down scale positions from the reference point. Accumulated numbers in the negative or down scale position (which are less than zero) are shown in the complemented form of the number such as 987.6543210987654 which represent a down scale position of −012.3456789012346. Since only the eight most significant digits, which are in the major sum remainder registers, are of readout significance, these are converted to −012.34568 by subtracting 987.65432 from 0 and dropping the borrow. This complementing operation is accomplished by running the number 987.65432 through the arithmetic unit while simultaneously enabling the N2 input (subtraction of PRI from SEC) to subtract the number from zero. The resulting difference is supplied to the readout shift register as the true negative number along with a negative sign signal. During this complementing conversion operation, the complemented form of the number is separately shifted through a bypass four bit shift register for rewriting into the delay line unit unchanged. It is necessary to use this alternate bypass path, because the information coming out of the arithmetic unit during the complementing readout cycle is not suitable form for re-entry into the delay line. To effect the complementing readout action, it is necessary to interrupt the normal conversion process for one circulation during the readout complementing operation.

In order to determine whether or not a complementing conversion operation is required during a readout, the major sum remainder register is examined in order to ascertain the value of the most significant bit stored in the major sum remainder register. By appropriate design, the capacity of the register is such, measured with respect to the maximum range of movement anticipated, that the most significant bit of the most significant digit of the major sum register will be at a logic 1 level only in the event that the sum accumulated in the register is a complement form of a negative number. Accordingly, by looking at the most significant digit of the major sum remainder register as it comes out of the output of the arithmetic unit (ARO), it is possible to determine whether or not a complementing operation is required during readout. The readout complementing circuitry for accomplishing this is shown in FIG. 9.

The complementing circuitry shown in FIG. 9 includes a major sum minus sensing flip-flop 301 having its set output terminal connected to one of the input terminals of a four input AND gate 302. The four input AND gate 302 has its remaining input terminals connected to a read start signal developed by a pushbutton actuated circuit, for example, which produces a timing read start signal that is two circulations long (that is it extends over two circulations of all three functions from F1, F2, F3). Accompanying the read start signal is a read signal which spans only functions 1, 2 and 3 in succession in the last half of the read start signal. The read signal identifies the time interval during which the ARO signals are fed to the readout shift register 24. In addition, an RW2 and an LTR1 signal is supplied where the LTR signal denotes whether it is desired to read out the X axis, the Y axis or the Z axis. The major sum minus flip-flop 301 has one of its set steering input terminals connected directly to the ARO output of the arithmetic unit with the reset steering input terminal connected through a power driver inverter 303 to the output of the ARO signal. In addition, a second set of set and reset input steering terminals are connected together to the output of an inverter 304 which in turn is connected to the output of a four input AND gate 305. AND gate 305 has one of its inputs connected to the digit 8 timing signal D8, a second input terminal connected to the word 2 delayed timing signal W2D, its third input terminal connected to the bit 1 timing signal B1, and its fourth input connected to the read start signal. Lastly, a third pair of interconnected set and reset input steering terminals are connected directly to an input terminal to which the function 2 timing signal F2 is applied assuming that it is desired to read out the X axis servo position. It should be noted at this point, that a separate complementing readout circuit such as shown in FIG. 9 is required for each of the X, Y and Z axes. Accordingly, substantially all of the circuitry shown in FIG. 9 will have to be reproduced for each axis with the exception of the summing OR gate from which the RECOUNT signal is derived for prohibiting the recognition gates during a readout complementing operation. For the purpose of the present discussion, it is assumed however that the X axis position signal is to be read out.

The function 2 timing signal F2 is also supplied to one of the input gates of a three input AND gate 306 and to an input of a second three input AND gate 307. The AND gate 306 has a second input connected to the word 2 timing signal W2, and the AND gate 307 has a second input terminal connected to the word 1 delay W1D timing signal. Both AND gate 306 and 307 have input gates connected in common to the output of an inverter circuit 308 that in turn is connected to the output of the four input AND gate 302. By reason of the above interconnections, it will be appreciated that if there is a negative number stored in the major sum remainder register, the major sum minus flip-flop 301 will be set thereby during digit 8, word 2 delayed, bit 1 time of function 2 (D8,W2D,B1). At this point in a circulation cycle, FF301 will be set and AND gate 302 will be enabled so as to produce a logic "0" signal at its output. The logic "0" is inverted by the inverter 308 to a logic " 1" that enables the AND gates 306 and 307. Hence, during word 2 time W2 and word 1 time delay (W1D), each of the gates 306 and 307 will provide enabling logic zero output signals at their output terminals which are denoted $\overline{\text{BYPASS}}$ and $\overline{\text{N2COMP}}$. The $\overline{\text{N2COMP}}$ logic "0" enabling potential is supplied to the N2 input of arithmetic unit 20 shown in FIG. 2 of the drawings through an OR gate 137 which inverts the logic "0" to a logic "1" signal thereby enabling the arithmetic unit 20 to subtract the PRI input signal from the SEC signal and effect the complementing subtraction from zero operation required to derive the desired true negative value.

Concurrently with the above described N2 complementing operation, the $\overline{\text{BYPASS}}$ logic "0" enabling signal similarly is supplied to one input terminal of the five input AND gate 142 shown in FIG. 2. This will cause AND gate 142 to produce a logic "1" steering input enabling potential to the ARO entry timing resync FF141 which causes it to clear at the next C1 clock pulse. Clearing of FF142 produces a logic "0" potential at its set output terminal that is applied to AND gate 101 and prohibits this gate from reentering the ARO output into delay line unit 22 during the readout complementing operation.

In addition to the above, the $\overline{\text{BYPASS}}$ signal during the function 2 time F2 is supplied through one of the inputs of a three input OR gate 311 having its remaining two input terminals connected to the $\overline{\text{BYPASS}}$ signal of the Y and Z axes, respectively. The output of OR gate 311 is connected to one of the input terminals of a two input AND gate 312. The two input AND gate 312 has its remaining input terminal connected to the output of a four bit delay shift register comprised by the flip-flops 151, 313, 314, and 315. The flip-flops 313, 314 314 and 315 and 151 are serially connected in an 8-4-2-1 code to form a four bit shift register that stores the four binary bits comprising one decimal digit value. The input of the 8 flip-flop 313 is connected directly to the DLO output of delay line unit 22 in parallel with the arithmetic unit 20, and the output of the 2 flip-flop 315 is connected to the input terminal of AND gate 312. AND gate 312 has its output connected through one of the inputs of an OR gate 148 whose output is connected to the input of the flip-flop 151. As described earlier, flip-flop 151 serves as a line data resync flip-flop, so that in effect it does double duty in that it stores the one bit of the 8-4-2-1 delay shift register, and also functions as a line data resynchronizing flip-flop. The output of the 1 flip-flop 151 is supplied through OR gate 102 to the delay line unit 22.

From the foregoing description, it will be appreciated therefore that the $\overline{\text{BYPASS}}$ signal from any one of the X, Y or Z axes will serve to enable AND gate 312 through OR gate 311 and thus will function to bypass the arithmetic unit 20. Hence data coming out of the output of delay line unit 22 is delayed four bits in the delay shift register and then reentered back into the delay line unit at the precise value at which it emerged. Concurrently with this action, due to the application of the $\overline{\text{BYPASS}}$ signal to the inputs of the AND gate 142, ARO entry timing resync flip-flop F3 will be reset or cleared so as to disenable AND gate 101. Disenabling of AND gate 101 will prohibit the ARO output from the arithmetic unit 20 from being supplied back up through the OR gate 102 to the input of delay line unit 22. Thus, it will be appreciated that during the complementing readout operation, the ARO output of the arithmetic unit is not reentered into the delay line unit, but instead is blocked, and the data in its original form after delay in the delay shift register is reentered. This is due to the fact that the true member emerging at the output of the arithmetic unit during the complementing operation is not suitable for reentry in the delay line unit. Consequently, it is preserved in its original form by means of the bypass shift register and then reentered in the delay line unit.

Returning to FIG. 9 of the drawing, from the above description it will be appreciated that in the presence of a read start signal, the major sum minus flip-flop 301 will be set during function 2 time, digit 8 word 2 delay and at bit 1 time (D8,W2D,B1) as indicated in the timing diagram shown in FIG. 9A of the drawings. The set condition of the major sum minus flip-flop 301 will then enable four input AND gate 302 so as to further enable the AND gates 306 and 307. This results in setting up the complementing operation of the arithmetic unit as well as to enable bypass of the number being complemented around the arithmetic unit by the bypass shift register during a complementing operation. Concurrently with these actions, a logic "0" $\overline{\text{COMPLEMENT}}$ signal is supplied to one input of a two input AND gate 315 whose remaining input terminal is connected to the F3 timing signal (for the X axis). The output terminal of AND gate 315 is connected through one of the input terminals of a three input OR gate 316 whose output is supplied as a RECOUNT inhibiting signal back to the count recognition gates for inhibiting the operation of the conversion process during the complementing operation. The RECOUNT signal will in effect inhibit the further development of the INT 1, INT 10, INT 100, SUB, etc., timing signals for a given axis so as to prevent further normal conversion operation of the arithmetic unit during the complementing readout operation.

From a further examination of FIG. 9A, it will be seen that the X axis readout circuitry of FIG. 9 is set up only at the end of function 2 time F2 during the first circulation of the two circulations spanned by the read start signal. Accordingly, it is not until the second circulation of the F2 timing signal and the data contained in the delay line unit that the complementing operation can take place. During this second circulation of the function 2 data, the AND gates 306 and 307 will be enabled. Hence during this second circulation of function 2, and during word 1 delayed time W1D, the major sum remainder register value stored in word 1 will be complemented by the arithmetic unit. This is done by subtracting the value in the major sum remainder register from zero, and providing the true negative value result as the ARO output from the arithmetic unit. This ARO output may then be supplied to a readout shift register along with a suitable sign signal to indicate that it is a true negative number. Simultaneously with this complemented readout, during word 2 time W2 of function 2 (second circulation) the AND gate 306 develops the $\overline{\text{BYPASS}}$ enabling signal that allows the bypass shift register to bypass the complemented number in the major sum remainder register around the arithmetic unit and reenter it into the delay line in its original form. At the end of the function 2 time, during digit 8 word 2 delay at bit 1 time (D8,W2,B1) he major sum minus flip-flop 301 will be reset due to the fact that at this point the ARO output is in its true negative value form, and hence will be zero value thereby allowing the major sum minus flip-flop 301 to reset or clear. Clearing of the major sum minus flip-flop 301 disenables AND gate 302 which in turn disenables the AND gates 306 and 307. This also results in enabling AND gate 315 during function 3 time so as to allow the RECOUNT signal to the count recognition gates to become permissive (i.e., assume a logic 1 value) to again enable reading in of new counts stored in the buffer storage unit. The Y axis and the Z axis circuitry will function in an identical manner during F3 and F1 times, respectively to develop at the output of the arithmetic unit the true negative value of a complemented number stored in the major sum remainder register.

From the foregoing description, it will be appreciated that the invention provides a new and improved digitally operable, numerical control for an automatic machine tool. The control includes a new and improved digitally operable numerical conversion apparatus that comprises a digital integrator having arithmetic processing means for selectively processing one of the variable values supplied to the control either in a scale of 1 or in some larger scaling factor whereby some known multiple of the actual value is processed in a single operating cycle of the conversion apparatus to thereby provide improved processing speeds for the overall control. In a particular embodiment of the invention the equipment operates with binary coded decimal digit values and the known multiple of the actual value being processing by the arithmetic processing means is some known power of 10. This conversion apparatus is capable of converting an input serial of electric signal pulses which are indicative of a quantity being measured into a digital count of standard measurement units. The conversion apparatus is comprised by a digital integrator having integrand register, a minor sum remainder register an a major sum remainder register all of substantially equal length. A known conversion constant is stored in digital form in the integrand register and the accumulated count in both the minor sum and the major sum remainder registers provides the output reading in standard measurement units. The digital integrator includes arithmetic processing means for selectively entering values equal to the conversion factor stored in the integrand register into one of the remainder registers in response to the input series of electric signal fringe count pulses from an interferometer positioning device, and for transferring overflow values from the minor sum remainder register into the major sum remainder register in a manner such that the value accumulated in both the major and minor sum remainder registers is indicative of the position of the machine tool head in standard measurement units. The digitally operable conversion apparatus possessing these characteristics is capable of processing three different time sequential functions wherein each function corresponds to the processing operations performed with relation to one axis of a three orthogonal axis machine tool control system. Each of the three sets of input electric signal pulses, there being one set for each of the orthogonal axes, comprises the output fringe count signal pulses of an interferometer position measuring device for the respective axes. This digitally operable conversion apparatus having the above set forth characteristics also is capable of selectively changing the conversion factors stored in the integrand register for each of the three functions, and for selectively entering the conversion factor into one of the remainder registers either on a one for one basis wherein one conversion factor is entered for each input signal pulse, or with larger scaling factors wherein known multiples of the conversion factor are entered in a single cycle of operation of the arithmetic processing means for an equal multiple number of input signal pulses whereby improved processing speeds of the conversion apparatus are obtained. The invention also makes possible a numerically controlled system including a new and improved feedback timing interval control circuit for converting variably scaled outputs from the conversion apparatus into feedback interval timing signals suitable for use with a phase analog type of position feedback system. The system also includes readout circuit means for selectively reading out the values stored in the major sum remainder register of the conversion apparatus. This readout circuit means includes complementing circuit means for reading out complemented numbers stored in the major sum remainder register to provide a true negative number at the output of the apparatus together with an indication of the sign of the output to indicate that the output number is negative in character. This complementing circuit means further includes bypass shift register means for bypassing the number being complemented around the arithmetic processing unit and back into the delay line recirculation unit during a complementing readout operation.

Having described one embodiment of a new and improved numerically controlled machine tool positioning system constructed in accordance with the invention, it is believed obvious that other modifications and variations of the present invention are possible in the light of the above teachings. It is therefore to be understood that changes may be made in the particular embodiment of the invention described which are within the full intended scope of the invention as defined by the appended claims.

What is claimed and desired to be secured by Letters Patent of the United States is:

1. A digitally operable conversion apparatus for converting an input series of electric signal pulses indicative of a quantity being measured in a known but nonstandard measurement unit, the input signal pulses including a positive or negative direction indication, into a digital count of standard measurement units likewise indicative of the quantity being measured, said apparatus comprising:

A. a digital integrator having an integrand register, a minor sum remainder register and a major sum remainder register, all of the registers being substantially equal in length and the known conversion being stored as digital values in the integrand register, B. and arithmetic processing means for selectively accumulating digital values equal to the conversion factor stored in the integrand register into one of the remainder registers in response to the input series of electric signal pulses and for transferring overflow values from the minor sum remainder register into the major sum remainder register whereby the value accumulated in the major and minor sum remainder registers is indicative of the quantity being measured in standard measurement units, said arithmetic processing means including;

1. logic circuit means for selectively adding or subtracting values of the conversion factor stored in the integrand register into at least one of the remainder registers in response to the direction indication of the input electric signal pulses,
2. enabling circuit means responsive to the direction indication of the input signal pulses coupled to and controlling the operation of the logic circuit means whereby the logic circuit means selectively is caused to operate in either the additive or subtractive mode,
3. a circulatable register comprising a delay line recirculating means having its output connected to the input of said logic circuit means and its input connected to the output of said logic circuit means, and
4. timing circuit means for circulating said digital values to be processed through the closed loop comprised by said logic circuit means and said circulatable register in stepped time sequential relationship with the processing operations of the logic circuit means.

2. A digitally operable conversion apparatus according to claim 1 wherein the apparatus operates with binary coded decimal digits and the binary digits of corresponding decimal digit significance are time sequentially grouped together and the groupings interlaced in serial sequence whereby processing operations of the arithmetic processing means on binary coded digits of corresponding decimal digit significance is facilitated.

3. A digitally operable conversion apparatus according to claim 2 wherein the digital arithmetic processing means processes a single binary coded decimal digital value in a single processing cycle and imposes a time delay equal to a single binary coded decimal digital value during the processing cycle whereby a binary coded decimal digital value appearing at the output of the arithmetic processing means selectively may be fed back in timed sequence to an input of the arithmetic processing means as one of the inputs thereof for addition or subtraction to the next succeeding binary coded decimal digital value.

4. A digitally operable conversion apparatus according to claim 3 wherein the apparatus is capable of processing three different time sequential functions with each function corresponding to the processing operations performed with relation to one axis of a three orthogonal axes system and wherein each function is comprised of three words with each word forming the conversion factor integrand register, minor sum remainder register, and major sum remainder register, respectively, for a given function, the functions and words being arrayed on the delay line recirculating means in sequential time interlaced relationship in a manner such that the second word of a given function is occupied by the conversion factor integrand register of that function, the third word of the given function is occupied by the minor sum remainder register of that function, and the first word of the next succeeding function is occupied by the major sum remainder register of the preceding function whereby all three functions are arrayed and continuously recirculated through the delay line recirculating means and interconnected logic circuit means in sequential time interlaced relationship by the timing circuit means, and improved processed speeds are obtained.

5. A digitally operable conversion apparatus according to claim 4 wherein there are three sets of input electric signal pulses, one for each of the orthogonal axes and wherein each set of signal pulses comprises the output signal pulses of an interferometer position measuring device for a respective axis, and means are provided for selectively changing the conversion factor stored in the integrand register for each of the three functions.

6. A digitally operable conversion apparatus according to claim 5 wherein the means for changing the conversion factor includes sensing means for sensing the environmental conditions affecting the accuracy of the interferometer measuring device, and automatic means responsive to the output of said sensing means for automatically changing the conversion factor in response to changes in the environmental conditions in a manner so as to optimize the accuracy of the distance measurement.

7. A digitally operable conversion apparatus according to claim 3 further comprising readout circuit means for selectively reading out the value stored in the major sum remainder register, said readout circuit means including complementing circuit means for reading out complemented numbers stored in the major sum remainder register, the complementing circuit means comprising complemented number sensing circuit means for sensing the existence of a complemented number stored in the major sum remainder register, complement enabling circuit means operatively coupled to said complement number sensing circuit means and to said arithmetic processing means for enabling the arithmetic processing means to subtract the complemented number from zero and to provide a true negative number at its output, and sign indicating circuit means responsive to the complemented number sensing circuit means for providing an output sign signal indicative of the negative character of a complemented number being read out.

8. A digitally operable conversion apparatus according to claim 7 wherein the complementing circuit means further includes bypass shift register means operatively coupled intermediate the input and output of the delay line recirculating means, bypass enabling circuit means responsive to said complemented number sensing circuit means for enabling said bypass shift register means to bypass a complemented number being read out around the arithmetic processing means and back into the input to the delay line recirculating means during a complementing readout operation, and bypass inhibiting circuit means responsive to the complemented number sensing circuit means and coupled intermediate the output of the arithmetic processing means and the input to the delay line recirculating means for preventing the true form of the complemented number from being read into the delay line recirculation means during a complementing readout operation.

9. A digitally operable conversion apparatus according to claim 8 wherein the apparatus is capable of processing three different time sequential functions with each function corresponding to the processing operations performed with relation to one axis of a three orthogonal axes system and wherein each function is comprised of three words with each word forming the conversion factor integrand register, minor sum remainder register, and major sum remainder register, respectively, for a given function, the functions and words being arrayed on the delay line recirculating means in sequential interlaced relationship in a manner such that the second word of a given function is occupied by the conversion factor integrand register of that function, the third word of the given function is occupied by the minor sum remainder register of that function, and the first word of the next succeeding function is occupied by the major sum remainder register of the preceding function whereby all three functions are arrayed and continuously recirculated through the delay line recirculating means and interconnected logic circuit means in sequential time interlaced relationship by the timing circuit means, and improved processing speeds are obtained.

10. In a numerical control, digitally operable conversion apparatus for converting an input series of electric signal pulses indicative of a quantity being measured in a known but nonstandard measurement unit into a digital count of standard measurement units likewise indicative of the quantity being measured, said apparatus comprising a digital integrator having an integrand register, a minor sum remainder register and a major sum remainder register, all of the registers being substantially equal in length and the known conversion factor being stored in digital form in the integrand register, arithmetic processing means for selectively summing values equal to the conversion factor stored in the integrand register into one of the remainder registers in response to the input series of electric signal pulses and for transferring overflow values from the minor sum remainder register into the major sum remainder register whereby the value accumulated in the major and minor sum remainder registers is indicative of the quantity being measured in standard measurement units, and scaling means for selective entering the conversion factor into the remainder registers either on a one for one basis wherein one conversion factor is entered for each input signal pulse or known multiples of the conversion factor are entered in a single cycle of operation of the arithmetic processing means for an equal multiple number of input signal pulses whereby improved processing speeds of the conversion apparatus are obtained.

11. A digitally operable conversion apparatus according to claim 10 wherein the input signal pulses include a positive or negative direction indication and wherein the arithmetic processing means includes logic circuit means for selectively adding or subtracting the conversion factor values stored in the integrand register into at least one of the remainder registers in response to the direction indicative of the input electric signal pulses, and enabling circuit means responsive to the direction indication of the input signal pulses coupled to and controlling the operation of the logic circuit means whereby the logic circuit means selectively is caused by operate in either the additive or subtractive mode.

12. A digitally operable conversion apparatus according to claim 11 wherein the arithmetic processing means is comprised by logic circuit means, delay line recirculating means having its output coupled to the input of the logic circuit means and its input coupled to the output of the logic circuit means, and timing circuit means for recirculating the digital values to be processed through the closed loop comprised by the logic circuit means and the delay line recirculating means in stepped time sequential relationship with the processing operations of the logic circuit means.

13. A digitally operable conversion apparatus according to claim 12 wherein the apparatus operates with binary coded decimal digits and the binary digits of the same decimal digit significance are time sequentially grouped together and the groupings interlaced in serially adjoining time relationship whereby processing operations of the arithmetic processing means on binary coded digits of corresponding decimal digit significance is facilitated, and said scaling means operates in known powers of 10 selectively to enter the conversion factor into the remainder register by ones, tens or hundreds for corresponding numbers of input signal pulses.

14. A digitally operable conversion apparatus according to claim 13 wherein said scaling means comprises delay shift register means having its input connected to the output of the arithmetic processing means and having its output selectively connected back to the input of said arithmetic processing means for delaying at least one of the binary coded decimal digital values sufficiently to increase its significance by at least one decimal point prior to resupplying the delayed value to the arithmetic processing means for entering into one of the remainder registers at a more significance value.

15. A digitally operable conversion apparatus according to claim 14 further comprising scale of 10 enabling circuit means operatively coupled to said delay shift register means and to the arithmetic processing means and responsive to build up in the count to be converted in a buffer storage means for entering values into the arithmetic unit whose significance has been increased by one decimal place.

16. A digitally operable conversion apparatus according to claim 15 further comprising scale of hundreds enabling circuit means operatively coupled to said delay shift register means and to the arithmetic processing means and responsive to build up in the count to be converted in the buffer storage and means for entering values into the arithmetic unit whose significance has been increased by two decimal places.

17. A digitally operable conversion apparatus according to claim 16 further comprising a plurality of sets of preliminary storage and intermediate and delayed working flip-flop memory means interconnected with each other and with said arithmetic processing means and a buffer memory means for supplying signal pulses to be converted to an input of the arithmetic processing means in scales of units, tens or hundreds, the scale of 10 and scale of hundreds intermediate and delayed working flip-flop memory means being operatively coupled through the scale of 10 enabling circuit means and the scale of hundreds enabling circuit means, respectively, for enabling the arithmetic unit to process in the scale of 10 and hundreds, the preliminary storage flip-flop memory means serving to preliminarily store input data supplied thereto, and to supply the same to the intermediate and delayed working flip-flop memory means for use by the arithmetical processing means at an appropriate point in a processing cycle.

18. A digitally operable conversion apparatus according to claim 16 further comprising readout circuit means for selectively reading out the value stored in the major sum remainder register, said readout circuit means including complementing circuit means for reading out complemented numbers stored in the major sum remainder register, the complementing circuit means comprising complemented number sensing circuit means for sensing the existence of a complemented number stored in the major sum remainder register, complement enabling circuit means operatively coupled to said complement number sensing circuit means and to said arithmetic processing means for enabling the arithmetic processing means to subtract the complemented number from zero and to provide a true negative number at its output, and sign indicating circuit means responsive to the complemented number sensing circuit means for providing an output sign signal indicative of the negative character of a complemented number being read out.

19. A digitally operable conversion apparatus according to claim 18 wherein the complementing circuit means further includes bypass shift register means operatively coupled intermediate the input and output of the delay line recirculating means, bypass enabling circuit means responsive to said complemented number sensing circuit means for enabling said bypass shift register means to bypass a complemented number being read out around the arithmetic processing means and back into the input to the delay line recirculating means during a complementing readout operation, and bypass inhibiting circuit means responsive to the complemented number sensing circuit means and coupled intermediate the output of the arithmetic processing means and the input to the delay line recirculating means for preventing the true form of the complemented number from being read into the delay line recirculation means during a complementing read-out operation.

20. A digitally operable conversion apparatus according to claim 19 wherein the apparatus is capable of processing three different time sequential functions with each function corresponding to the processing operations performed with relation to one axis of a three orthogonal axes system and wherein each function is comprised of three words with each word forming the conversion factor integrand register, minor sum remainder register, and major sum remainder register, respectively, for a given function, the functions and words being arrayed on the delay line recirculating means in sequential time interlaced relationship in a manner such that the second word of a given function is occupied by the conversion factor integrand register of that function, the third word of the given function is occupied by the minor sum remainder register of that function, and the first word of the next succeeding function is occupied by major sum remainder register of the preceding function whereby all three functions are arrayed and continuously recirculated through the delay line recirculating means and interconnected logic circuit means in sequential time interlaced relationship by the timing circuit means, and improved processing speeds are obtained.

21. A digitally operable conversion apparatus according to claim 20 wherein there are three sets of input electric signal pulses, one for each of the three orthogonal axes and wherein each set of input signal pulses comprises the output signal pulses of an interferometer position measuring device for a respective axis, and means are provided for selectively changing the conversion factor stored in the integrand register for each of the three functions.

22. A digitally operable conversion apparatus according to claim 21 wherein the means for changing the conversion factor in the integrand register for each of the three functions includes sensing means for sensing an environmental condition effecting the accuracy of the interferometer measuring device, and automatic means responsive to the output of said sensing means for automatically changing the conversion factor in response to changes in the environmental condition in a manner so as to optimize the accuracy of the distance measurement.

* * * * *